(12) United States Patent
Chang et al.

(10) Patent No.: US 11,362,711 B2
(45) Date of Patent: Jun. 14, 2022

(54) ANTENNA SELECTION METHOD AND DEVICE

(71) Applicant: Huawei Technologies Co., Ltd., Shenzhen (CN)

(72) Inventors: Chih-Hua Chang, Taipei (CN); Chien-Jen Huang, Shanghai (CN); Chien-Ming Lee, Shenzhen (CN); Yuan-Hao Lan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/299,179

(22) PCT Filed: Dec. 3, 2018

(86) PCT No.: PCT/CN2018/119015
§ 371 (c)(1),
(2) Date: Jun. 2, 2021

(87) PCT Pub. No.: WO2020/113393
PCT Pub. Date: Jun. 11, 2020

(65) Prior Publication Data
US 2022/0077904 A1   Mar. 10, 2022

(51) Int. Cl.
*H04B 7/02* (2018.01)
*H04B 7/06* (2006.01)
*H04B 7/0413* (2017.01)

(52) U.S. Cl.
CPC ......... *H04B 7/0608* (2013.01); *H04B 7/0691* (2013.01); *H04B 7/0413* (2013.01)

(58) Field of Classification Search
CPC ... H04B 7/0608; H04B 7/0691; H04B 7/0413
(Continued)

(56) References Cited

U.S. PATENT DOCUMENTS

| 2005/0090205 A1 | 4/2005 | Catreux-Erceg et al. |
| 2008/0081570 A1 | 4/2008 | Jeong et al. |

(Continued)

FOREIGN PATENT DOCUMENTS

| CN | 1860701 A | 11/2006 |
| CN | 101437008 A | 5/2009 |

(Continued)

OTHER PUBLICATIONS

Heo, J., "Simultaneous Sensing and Transmission in Cognitive Radio," IEEE Transactions on Wireless Communications, vol. 13, No. 4, Apr. 2014, 12 pages.

*Primary Examiner* — Zewdu A Kassa
(74) *Attorney, Agent, or Firm* — Conley Rose, P.C.

(57) ABSTRACT

An antenna selection method includes selecting $M_1$ antenna sets from $C_{N-L_1}^{L_2}$ antenna combinations, where $L_1$ is a quantity of reserved antennas, a sum of $L_1$ and $L_2$ is equal to L, determining an antenna set with a maximum channel capacity, in $M_2$ antenna sets, as a target antenna set to perform a preset-duration data transmission, where the $M_2$ antenna sets are antenna sets formed by the $M_1$ antenna sets and the $L_1$ reserved antennas. The $L_1$ reserved antennas include a maximum SNR in a target antenna set used in previous preset-duration data transmission. Each of the $M_2$ antenna sets includes the $L_1$ reserved antennas.

20 Claims, 12 Drawing Sheets

---

101 — A receiving end selects $M_1$ antenna sets from $C_{N-L_1}^{L_2}$ antenna combinations 102 — The receiving end determines, in $M_2$ antenna sets, an antenna set with a maximum channel capacity as a target antenna set 103 — The receiving end may switch an antenna selection circuit to the target antenna set to perform data transmission

(58) Field of Classification Search
USPC ........ 375/267, 261, 260, 259, 219, 316, 295
See application file for complete search history.

(56) References Cited

U.S. PATENT DOCUMENTS

2008/0247330 A1* 10/2008 Ko .................... H04B 7/0691
  370/252
2009/0191832 A1  7/2009 Catreux-Erceg et al.
2015/0010099 A1  1/2015 Lin et al.

FOREIGN PATENT DOCUMENTS

| CN | 101944940 A   | 1/2011  |
|----|---------------|---------|
| CN | 102006112 A   | 4/2011  |
| CN | 103312395 A   | 9/2013  |
| CN | 105981308 A   | 9/2016  |
| CN | 106452533 A   | 2/2017  |
| CN | 107317610 A   | 11/2017 |
| CN | 107342802 A   | 11/2017 |
| EP | 3096465 A1    | 11/2016 |
| WO | 2013135872 A1 | 9/2013  |

* cited by examiner

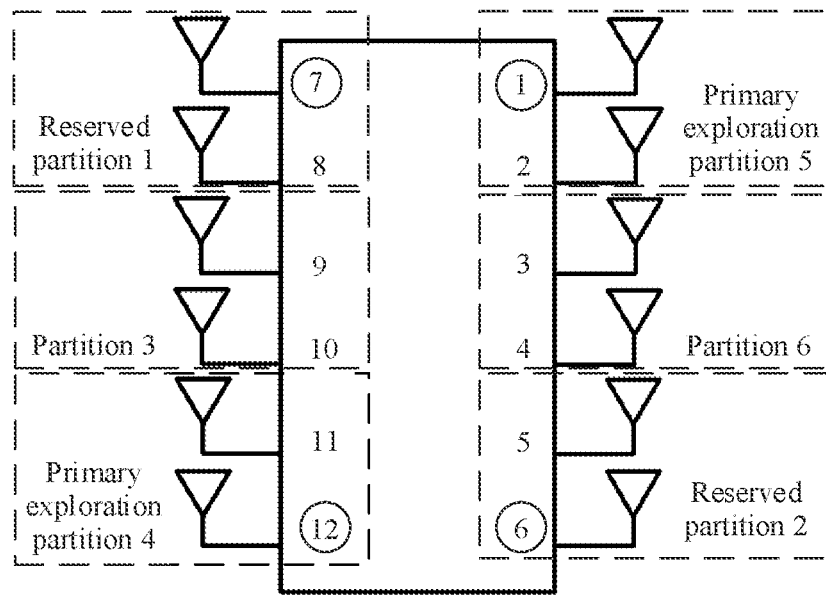
Antenna set {6, 7, 1, 12} corresponding to the
farthest set of primary exploration partitions
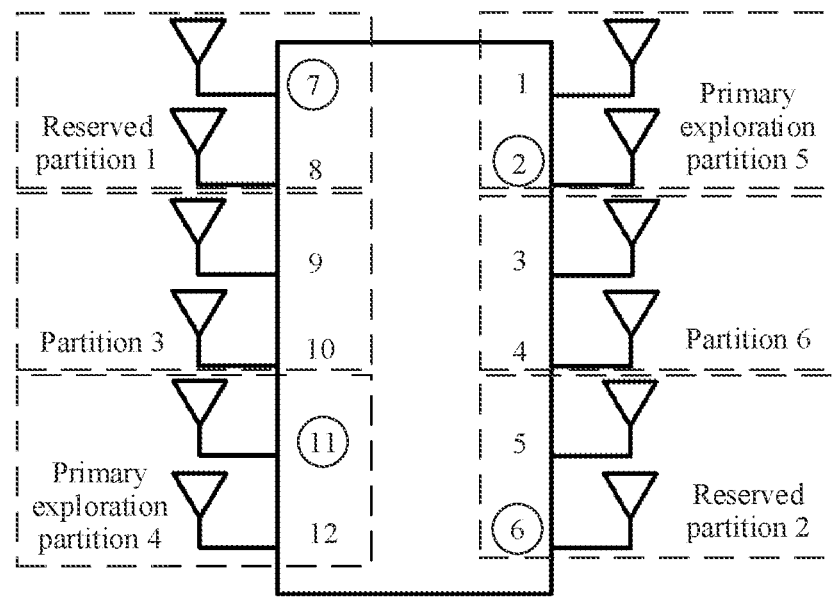
Antenna set {6, 7, 2, 11} corresponding to the
nearest set of primary exploration partitions
TO
FIG. 8a-2
FIG. 8a-1

… …

ANTENNA SELECTION METHOD AND DEVICE

CROSS-REFERENCE TO RELATED APPLICATIONS

This application is a U.S. National Stage of International Patent Application No. PCT/CN2018/119015 filed on Dec. 3, 2018, which is hereby incorporated by reference in its entirety.

TECHNICAL FIELD

This application relates to the field of communications technologies, and in particular, to an antenna selection method and a device.

BACKGROUND

In recent years, with prosperous development of communications technologies, requirements for communication quality and a communication speed are increasing. However, a spectrum, as a scarce resource, cannot grow unlimitedly. Therefore, how to meet the requirements with limited spectrum resources is the biggest challenge for the communications technologies.

Currently, a multiple-input multiple-output (Multiple-Input Multiple-Output, MIMO) system is a widely used core technology, and has a beamforming capability, a spatial diversity technology, spatial multi-tasking, and the like to improve spectral efficiency of a communications system by assuming, at a transmitting end and a receiving end, a spatial degree of freedom provided by a plurality of antennas, and further achieve an objective of improving communication quality and a transmission rate.

Antenna performance may be affected because of an environment or an application scenario after the MIMO system is used. This further affects a channel capacity of the MIMO system. Therefore, more antennas are deployed inside a device. Selection of a plurality of antennas ensures that the MIMO system has good antenna performance in different environments and scenarios, and the channel capacity of the MIMO system is not affected.

Therefore, how to select an antenna set with comparatively good performance becomes an urgent problem to be resolved.

SUMMARY

This application provides an antenna selection method and a device, to determine an antenna set with comparatively good performance.

According to a first aspect, this application provides an antenna selection method. The method is applied to a device. N antennas are deployed in the device. A quantity L of antennas configured to transmit data is determined based on a service requirement of the device. For example, the antenna selection method may be applied to a transmitting end and a receiving end. The receiving end is used as an example. The receiving end selects $M_1$ antenna sets from $C_{N-L_1}^{L_2}$ antenna combinations, where $L_1$ is a quantity of reserved antennas, and a sum of $L_1$ and $L_2$ is equal to L; determines, in $M_2$ antenna sets, an antenna set with a maximum channel capacity as a target antenna set, where the $M_2$ antenna sets are antenna sets formed by the $M_1$ antenna sets and the $L_1$ reserved antennas, and $M_1$ is equal to $M_2$; and switches an antenna selection circuit to antennas in the target antenna set to perform data transmission. $C_{N-L_1}^{L_2}$ is a quantity of combinations each including $L_2$ different antennas selected from antennas except the $L_1$ reserved antennas in the N antennas each time. In addition, each of the $M_2$ antenna sets may include the $L_1$ reserved antennas with a maximum SNR. This greatly reduces a probability of an antenna set with comparatively poor performance in the $M_2$ antenna sets. Further, in a process in which the receiving end explores a channel capacity of each antenna set to determine the antenna set with the maximum channel capacity as the target antenna set, when the antenna selection circuit switches between the $M_2$ antenna sets to perform transient data transmission, sudden performance deterioration can be avoided with a great probability. Finally, the receiving end may perform the data transmission again by using the determined target antenna set.

The $L_1$ reserved antennas are $L_1$ antennas with the maximum SNR, in a target antenna set used in previous data transmission within preset-duration, N is an integer greater than 2, L is a positive integer greater than or equal to 2 and less than N, and $M_1$, $M_2$, $L_1$, and $L_2$ are positive integers.

In an optional implementation, in a process in which the receiving end performs data transmission within preset-duration by using the target antenna set, the receiving end may further detect whether the channel capacity of the target antenna set changes; and if the channel capacity of the target antenna set changes, perform the step of selecting $M_1$ antenna sets from $C_{N-L_1}^{L_2}$ antenna combinations to determine the target antenna set again. In this case, the $L_1$ reserved antennas are $L_1$ antennas with the maximum SNR in the target antenna set used in the data transmission process. In this implementation, performance of the target antenna set can be detected in the data transmission process, to further avoid data transmission performance deterioration.

In an optional design manner, preset duration in which the receiving end performs the data transmission by using the target antenna set within the preset duration or preset preset duration is Ts, and that the receiving end detects whether the channel capacity of the target antenna set changes may be: The receiving end determines a channel capacity of the target antenna set at Ts/2. The receiving end determines channel capacities of the target antenna set for a plurality of times after Ts/2. If the channel capacities determined by the receiving end for the plurality of times after Ts/2 are all less than the channel capacity determined by the receiving end at Ts/2, it indicates that performance of the target antenna set is poor. Therefore, the target antenna set may be determined again.

In an optional design manner, a relationship between the quantity $L_1$ of reserved antennas and the quantity L of antennas in an antenna set may be: $L_1$ is approximately L/2. In this way, it can be ensured that the reserved antennas in the antenna set can occupy a specific proportion. This reduces a probability of comparatively poor performance in the antenna set.

In an optional implementation, during initial execution of the antenna selection method, also referred to as at an initial phase in the antenna selection method, the following steps are performed to determine the target antenna set: The receiving end determines, in $M_3$ initially set antenna sets with stable performance, an antenna set with a maximum channel capacity as the target antenna set, to switch the antenna selection circuit to antennas in the target antenna set to perform the data transmission within preset-duration.

In another optional implementation, during initial execution of the antenna selection method, also referred to as at an initial phase in the antenna selection method, the following steps are performed to determine the target antenna set: The receiving end determines, in $M_1$ initially set antenna sets with stable performance, an antenna set with a maximum channel capacity. The receiving end determines, from the determined antenna set, $L_1$ antennas with a maximum SNR as the reserved antennas. Based on the $L_1$ reserved antennas, the receiving end performs the operation of selecting $M_1$ antenna sets from $C_{N-L_1}^{L_2}$ antenna combinations, to further determine the target antenna set from the $M_1$ antenna sets.

When detecting that the channel capacity of the target antenna set changes, the $M_1$ antenna sets are determined in the implementation described in the first aspect, to determine the target antenna set again.

In an optional implementation, after partitioning the N antennas deployed at the receiving end based on correlation between the antennas, the receiving end may further combine the N antennas with the $L_1$ reserved antennas to obtain the $M_2$ antenna sets. In a possible design manner, the receiving end partitions the N antennas based on correlation between the N antennas deployed at the receiving end, to obtain $N_1$ partitions. Each partition includes $L_3$ antennas, where $L_3$ is a positive integer. The receiving end selects the $M_1$ antenna sets from $C_{N_1}^{L_2}(C_{L_3}^1 \ldots C_{L_3}^1)_{L_2}$ antenna combinations. Antennas except the $L_1$ reserved antennas in each antenna set belong to different partitions. In other words, $C_{N_1}^{L_2}(C_{L_3}^1 \ldots C_{L_3}^1)_{L_2}$ represents a quantity of antenna combinations each including an antenna that is selected from each of $L_3$ antennas included in each of $L_2$ partitions selected from the $N_1$ partitions each time. It can be learned that, compared with that in the conventional technology in which antennas selected only from $N-L_1$ antennas are combined with the reserved antennas, in this implementation, the antennas separately selected from different partitions are combined with the reserved antennas to avoid a case in which the selected excessively correlated antennas affect spatial diversity of an MIMO system. In addition, a quantity of to-be-explored antenna sets is reduced, and algorithm complexity is reduced.

In an optional implementation, when determining the $M_2$ antenna sets, the receiving end may further obtain the $M_2$ antenna sets by combining antennas in primary exploration partitions and the reserved antennas. The primary exploration partitions are partitions that are farthest away from the reserved partitions in which the reserved antennas are located. Alternatively, the primary exploration partitions are partitions determined based on values of distances between the primary exploration partitions and the reserved partitions, and whether the primary exploration partitions are partitions in which antennas in the target antenna set used when the channel capacity is changed are located. The following describes optional design manners.

In an optional design manner, that the receiving end selects the $M_1$ antenna sets from $C_{N_1}^{L_2}(C_{L_3}^1 \ldots C_{L_3}^1)_{L_2}$ antenna combinations includes: The receiving end determines, in partitions except $N_3$ reserved partitions in the $N_1$ partitions, partitions with the largest distance to the $N_3$ reserved partitions as primary exploration partitions in the $N_1$ partitions. The $N_3$ reserved partitions are $N_3$ partitions including the reserved antennas, in the $N_1$ partitions. The receiving end selects the $M_1$ antenna sets from the $C_{N_2}^{L_2}(C_{L_3}^1 \ldots C_{L_3}^1)_{L_2}$ antenna combinations. $C_{N_2}^{L_2}(C_{L_3}^1 \ldots C_{L_3}^1)_{L_2}$ represents a quantity of antenna combinations each including an antenna that is selected from each of $L_3$ antennas included in each of $L_2$ partitions selected from $N_2$ primary exploration partitions each time. It can be learned that in the $M_2$ antenna sets obtained in this design manner, distances between the reserved antennas and the other antennas are comparatively long. Therefore, spatial diversity of the antenna set can be increased, performance of the MIMO system can be improved, and algorithm complexity can be further reduced.

In another possible design manner, that the receiving end selects the $M_1$ antenna sets from $C_{N_1}^{L_2}(C_{L_3}^1 \ldots C_{L_3}^1)_{L_2}$ antenna combinations includes: The receiving end sets a first weight for each of other partitions based on distances between $N_3$ reserved partitions and the other partitions except the $N_3$ reserved partitions in the $N_1$ partitions. The distance is in direct proportion to the first weight. The $N_3$ reserved partitions are $N_3$ partitions including the reserved antennas, in the $N_1$ partitions. The receiving end sets a second weight for each of the other partitions based on partitions where antennas in the target antenna set used in the previous data transmission within preset-duration belong to. Second weights for partitions where antennas in the target antenna set used in the previous data transmission within preset-duration belong to, are less than second weights for partitions where antennas in a target antenna set not used in the previous data transmission within preset-duration belong to. The receiving end determines, in the other partitions, partitions with the largest sum of the first weight and the second weight as primary exploration partitions. The receiving end selects the $M_1$ antenna sets from the $C_{N_2}^{L_2}(C_{L_3}^1 \ldots C_{L_3}^1)_{L_2}$ antenna combinations. $N_2$ is a quantity of primary exploration partitions in the $N_1$ partitions. $C_{N_1}^{L_2}(C_{L_3}^1 \ldots C_{L_3}^1)_{L_2}$ represents a quantity of antenna combinations each including an antenna that is selected from each of $L_3$ antennas included in each of $L_2$ partitions selected from the $N_2$ partitions each time.

In this design manner, optionally, that the receiving end sets a second weight for each of the other partitions based on partitions where non-reserved antennas in the target antenna set used in the previous data transmission within preset-duration belong to, may be: The second weights for the partitions where the non-reserved antennas in the target antenna set used by the receiving end to perform the previous data transmission within preset-duration belong to, are set to be negative values of first weights of the partitions. In this way, weights of the partitions are the smallest. It can be learned that in this design manner, when the target antenna set is determined again, the non-reserved antennas in the previous target antenna set whose channel capacity changes can be eliminated. Therefore, a probability of determining an antenna set with better performance can be increased, and the algorithm complexity is also reduced.

In addition, in this design manner, when the partitions where the non-reserved antennas in the target antenna set used in the previous data transmission within preset-duration belong to, are primary exploration partitions corresponding to the target antenna set, the second weight may be set for the partitions by using the foregoing implementation. The primary exploration partitions corresponding to the target antenna set are primary exploration partitions determined in a process of obtaining the $M_1$ antenna sets that include the $M_2$ antenna sets in the target antenna set. In other words, the second weights are set only when the partitions where the non-reserved antennas in the target antenna set belong to are the primary exploration partitions corresponding to the target antenna set. In this way, the primary exploration partitions corresponding to the target antenna set whose channel capacity changes can be prevented from being used as the primary exploration partitions again.

In an optional implementation, when determining the $M_1$ antenna sets, the receiving end may determine the $M_1$ antenna sets based on correlation between antennas in primary exploration partitions and the reserved antennas.

In an optional design manner, the receiving end may obtain $M_4$ antenna sets by combining the reserved antennas with the farthest set of the primary exploration partitions, and the nearest set of the primary exploration partitions, and obtain $L_2$ antennas with a maximum SNR in the primary exploration partitions by switching the antenna selection circuit to the $M_4$ antenna sets, as a first antenna set with the maximum SNR. The $M_1$ antenna sets may include the farthest set of the $N_2$ primary exploration partitions, the nearest set of the $N_2$ primary exploration partitions, and the first antenna set with the maximum SNR. Specifically, that the receiving end selects the $M_1$ antenna sets from $C_{N_2}^{L_2}$ $(C_{L_3}^{1} \ldots C_{L_3}^{1})_{L_2}$ antenna combinations includes: determining, in the $N_2$ primary exploration partitions, $L_2$ antennas with the highest correlation with the reserved antennas in the $N_3$ reserved partitions, to form the farthest set of the primary exploration partitions; determining, in the N2 primary exploration partitions, $L_2$ antennas with the least correlation with the reserved antennas in the $N_1$ reserved partitions, to form the closest set of the primary exploration partitions; combining the $L_1$ reserved antennas with the farthest set of the primary exploration partitions and the nearest set of the primary exploration partitions to obtain the $M_4$ antenna sets, where $M_4$ is a positive integer; sequentially switching the antenna selection circuit to the $M_4$ antenna sets, to obtain an SNR of each reserved antenna and an SNR of each antenna in the primary exploration partitions; and using the $L_2$ antennas with the maximum SNR in the primary exploration partitions as the first antenna set with the maximum SNR, where the $M_1$ antenna sets include the farthest set of the $N_2$ primary exploration partitions, the nearest set of the $N_2$ primary exploration partitions, and the first antenna set with the maximum SNR. It can be learned that in this implementation, the algorithm complexity can be further reduced.

In an optional implementation, in addition to the farthest set of the primary exploration partitions, the nearest set of the primary exploration partitions, and the first antenna set with the maximum SNR in the foregoing manner, the receiving end may further consider a second antenna set with a maximum SNR. The second antenna set with the maximum SNR is an antenna set formed by L antennas with the maximum SNR in the N antennas. In this implementation. SNRs of the reserved antennas and SNRs of antennas in primary exploration partitions may be determined by using the foregoing $M_4$ antenna sets. In this way, a probability of sudden performance deterioration in an SNR detection process can be reduced. For non-reserved antennas in the reserved partitions and antennas in secondary exploration partitions, the non-reserved antennas in the reserved partitions and the antennas in the secondary exploration partitions may be combined. $C_{N_1-N_2N_3}^{L_2} (C_{L_3}^{1} \ldots C_{L_3}^{1})_{L_2} C_{N_3}^{L_4}$ $(C_{L_3-L_4}^{1} \ldots C_{L_3L_4}^{1})_{L_1}$ antenna combinations are configured to explore an SNR of each antenna. Because the non-reserved antennas and the reserved antennas belong to a same partition, performance of an antenna set obtained based on a non-reserved antenna combination is not excessively poor, and the probability of the sudden performance deterioration in the SNR detection process can be reduced. It can be learned that this implementation can increase the probability of determining the antenna set with better performance. In addition, a difference from a method for selecting an antenna with a maximum SNR in the conventional technology lies in that the foregoing $M_4$ antenna sets and combination of the antennas in the secondary exploration partitions and non-reserved antennas m the reserved partitions may be used, to detect the SNR of each antenna. Therefore, the probability of the sudden performance deterioration in a process of exploring the SNR of each antenna is reduced.

Specifically, in this implementation, the receiving end combines the non-reserved antennas in the reserved partitions and the antennas in the secondary exploration partitions. In other words, the receiving end selects $M_5$ antenna sets from $C_{N_1-N_2-N_3}^{L_2} (C_{L_3}^{1} \ldots C_{L_3}^{1})_{L_2} C_{N_3}^{L_1} (C_{L_3-L_4}^{1} \ldots C_{L_3-L_4}^{1})_{L_1}$ antenna combinations. The secondary exploration partitions are partitions except the reserved partitions and the primary exploration partitions in the $N_1$ partitions. Each of the $M_5$ antenna sets includes $L_1$ non-reserved antennas and $L_2$ antennas in the secondary exploration partitions. The receiving end sequentially switches the antenna selection circuit to antennas in the $M_5$ antenna sets, to obtain an SNR of each antenna in the $M_5$ antenna sets. The receiving end determines, in the N antennas, L antennas with a maximum SNR as the second antenna set with a maximum SNR based on the SNRs of each reserved antenna and each antenna in the primary exploration partitions and the SNR of each antenna in the $M_5$ antenna sets. The $M_2$ antenna sets further include the second antenna set with the maximum SNR. In this case, in addition to the $M_1$ antenna sets obtained after the selected $M_1$ antenna sets are combined with the $L_1$ reserved antenna sets, the $M_2$ antenna sets further include the second antenna set with the maximum SNR. This helps to determine the target antenna set from the $M_2$ antenna sets. $M_5$ and $L_4$ are positive integers.

In an optional implementation, the foregoing implementations for determining the target antenna set may be performed at the beginning of execution of the antenna selection method and when the receiving end detects that the channel capacity of the target antenna set changes. For a case in which the receiving end detects that the channel capacity of the target antenna set does not change within the preset duration, the receiving end may determine, in the $M_2$ antenna sets corresponding to the target antenna set, the antenna set with the maximum channel capacity as the target antenna set for next preset duration, and may not need to perform the foregoing implementation again to determine the target antenna set for the next preset duration. Because the channel capacity of the target antenna set does not change within the preset duration, it indicates that the performance of the antenna set in the foregoing $M_2$ antenna set corresponding to the target antenna set is comparatively stable. Therefore, the algorithm complexity can be further reduced in this implementation.

According to a second aspect, this application further provides an antenna selection apparatus. The antenna selection apparatus has functions of implementing operations in the foregoing method embodiment. The functions may be implemented by hardware, or may be implemented by hardware executing corresponding software. The hardware or the software includes one or more modules corresponding to the foregoing functions.

In a possible design, the antenna selection apparatus may be used in a device, and may include a processor and a transceiver. For example, the processor is configured to support a corresponding function in the foregoing method. The transceiver is configured to: support communication between the antenna selection apparatus and another device, and receive or detect a channel capacity and the like in the foregoing method. The antenna selection apparatus may further include a memory. The memory is configured to: be coupled to the processor, and store a program instruction and data that are necessary for the antenna selection apparatus.

In another possible design, the antenna selection apparatus may be used in a device, and may include a selection unit, a determining unit, a switching unit, and the like, to perform corresponding functions of the steps in the foregoing method. For example, the selection unit is configured to select $M_1$ antenna sets from $C_{N-L_1}^{L_2}$ antenna combinations. The determining unit is configured to determine, in $M_2$ antenna sets, an antenna set with a maximum channel capacity as a target antenna set. The $M_2$ antenna sets are antenna sets formed by the $M_1$ antenna sets and the $L_1$ reserved antennas. The switching unit is configured to switch an antenna selection circuit to antennas in the target antenna set to perform data transmission.

According to a third aspect, an embodiment of this application provides a computer-readable storage medium. The computer-readable storage medium stores a computer program used in the method according to the first aspect. The computer program includes at least one segment of code. The at least one segment of code may be executed by a computer, to control the computer to execute the program designed in the first aspect.

According to a fourth aspect, an embodiment of this application provides a computer program product. When the computer program product runs on a computer, the computer is configured to perform the steps performed in the implementations or the embodiments of the first aspect. Some or all of the computer programs may be stored in a storage medium that is encapsulated together with a processor, or may be stored in a memory that is not encapsulated together with a processor.

According to a fifth aspect, an embodiment of this application further provides a processor. The processor includes at least one circuit, configured to combine a plurality of antennas to obtain a plurality of antenna sets. The processor further includes at least one circuit, configured to detect a channel capacity of each antenna set, and determine a target antenna set. The processor may be a chip, and may execute an instruction or a program used to implement the method in the first aspect.

According to a sixth aspect, an embodiment of this application further provides a chip system. The chip system includes a processor. For example, the processor is used in a transmitting end or a receiving end and is configured to implement the function or the method in the first aspect. For example, the processor generates or processes the plurality of antenna sets, the target antenna set, or the like in the foregoing method. In a possible design, the chip system further includes a memory. The memory is configured to store a program instruction and data that are necessary for performing the function in the method in the first aspect. The chip system may include a chip, or may include a chip and another discrete component.

BRIEF DESCRIPTION OF DRAWINGS

FIG. 8a-1 and FIG. 8a-2 are a schematic diagram of $M_1$ antenna sets according to an embodiment of this application;

DESCRIPTION OF EMBODIMENTS

Terms used in embodiments of this application are only used to explain specific embodiments of this application, but are not intended to limit this application.

To facilitate understanding of related content in the embodiments of this application, a to-be-resolved technical problem and an application scenario in this application are first described.

Currently, with prosperous development of communications-related technologies, people's requirements for communication quality and communication speed are increasing. However, a spectrum, as a scarce resource, cannot grow unlimitedly. Therefore, how to meet the requirements with limited spectrum resources is the biggest challenge for the communications technologies. A multiple-input multiple-output (Multiple-Input Multiple-Output. MIMO) system is a widely used core technology, and is deployed with a plurality of antennas between a transmitting end and a receiving end. A spatial degree of freedom provided by the plurality of antennas can improve spectral efficiency of a communications system and further achieve an objective of improving the communication quality and the communication speed.

Antenna performance may be affected because of an environment or an application scenario after the MIMO system is used. This further affects a channel capacity of the MIMO system. Therefore, more antennas are deployed inside a device, and selection of a plurality of antennas ensures that the MIMO system can have good antenna performance in different environments and scenarios, and the channel capacity of the MIMO system is not affected. An antenna selection method may be used to resolve this problem. A group of antennas with comparatively excellent performance are selected, and then a radio frequency circuit including an analog-to-digital converter and the like are switched, by using an antenna selection circuit, to the selected antennas with comparatively excellent performance for subsequent signal processing.

Figure 1:
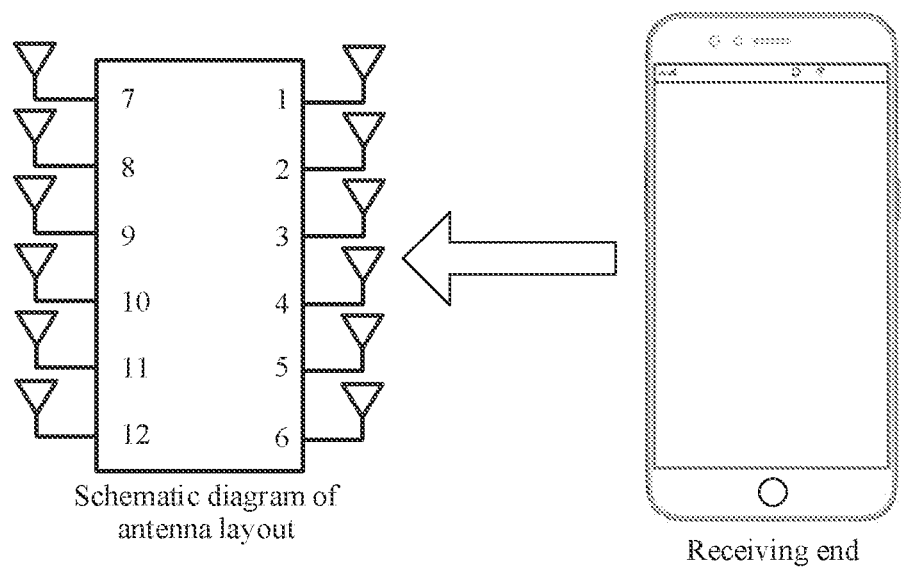
FIG. 1 is a schematic diagram of 12 antennas deployed at a receiving end.
Figure 2:
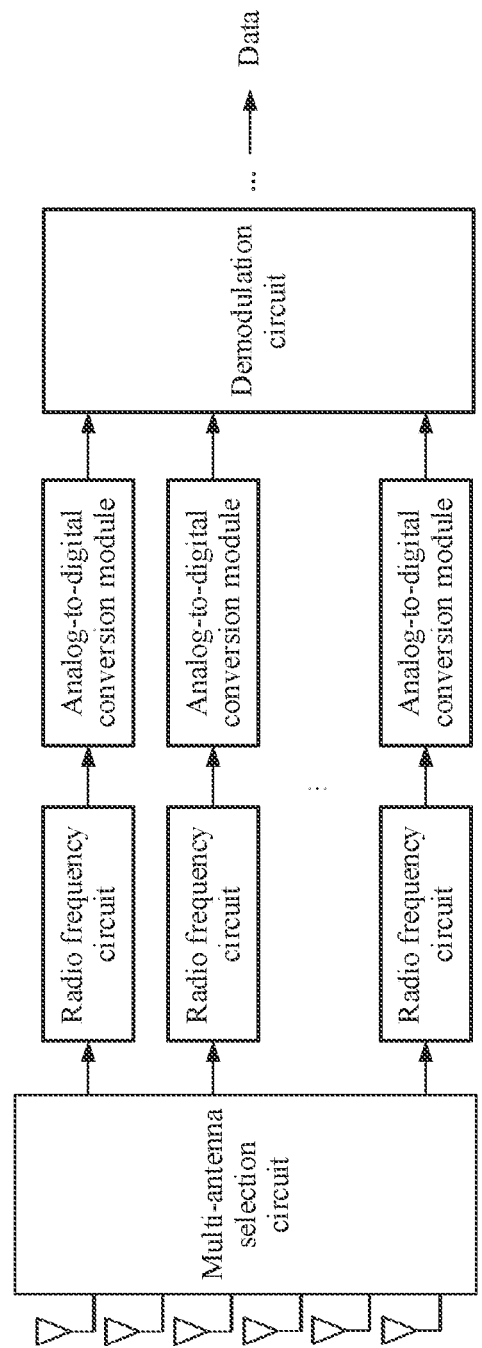
FIG. 2 is a schematic diagram of an antenna selection circuit.

For example, FIG. 1 is a schematic diagram of 12 antennas deployed at a receiving end. Four antennas need to be selected from the 12 antennas to perform data transmission. FIG. 2 is a schematic diagram of an antenna selection circuit. As shown in FIG. 2, the right end of the antenna selection circuit is sequentially connected to a signal processing related module or circuit, such as a radio frequency circuit, an analog-to-digital conversion module, and a demodulation circuit. At the left end of the antenna selection circuit, a signal processing circuit is connected to any one or more antennas shown in FIG. 1 by using a selector switch, to transmit signals received through the one or more antennas to the signal processing related circuit for processing. A quantity of to-be-selected antennas in the antenna selection method is determined based on a channel state. For example, a transmitting end may determine, based on a channel state measurement result, a quantity of antennas required for uplink and downlink data transmission. A receiving end may determine, based on downlink control information delivered by a transmitting end, a quantity of to-be-selected antennas. The downlink control information is determined by the transmitting end based on a channel state measurement result. In other words, in the embodiments of this application, the quantity of antennas included in an antenna set is determined based on the channel state or downlink control information.

Therefore, to ensure a received signal has better quality, an antenna selection method needs to be used to determine one or more antennas with comparatively good performance in real time, for switching by an antenna selection circuit.

Figure 3:
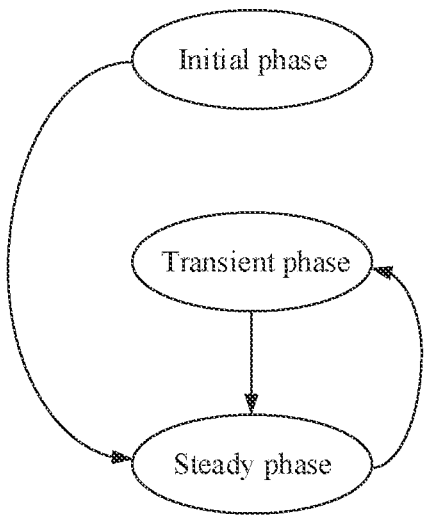
FIG. 3 is a schematic diagram of a finite state machine.

In an optional implementation, for ease of describing the antenna selection method, a finite state machine is used for description in the embodiments of this application. For example, a finite state machine may include at least one of a transient phase (or referred to as transient or a transient state), an initial phase (or referred to as an initial state), and a steady phase (or referred to as a steady state or a steady-state), to describe different phases of the antenna selection method and trigger conditions for entering the different phases. For example, FIG. 3 is a schematic diagram of a finite state machine. As shown in FIG. 3, the finite state machine includes a transient phase, an initial phase, and a steady phase. With reference to an antenna selection method, the initial phase may be a phase in which a device starts to perform the antenna selection method. The steady phase is determined relative to the antenna selection method in which each antenna set is sequentially switched, to obtain a transient state of channel state information of each antenna. In other words, in a process of determining a target antenna set in the antenna selection method, an antenna selection circuit is sequentially switched to each antenna set to perform transient data transmission, to obtain channel state information of an antenna, for example, an SNR of each antenna and/or a channel capacity of the antenna set. Once the target antenna set is determined based on the channel state information, the antenna selection circuit is switched to the target antenna set to perform steady data transmission, namely, data transmission for a comparatively long time. Therefore, in the embodiments of this application, the process of determining the target antenna set is referred to as the transient phase of the antenna selection method. A phase of performing the data transmission by using the determined target antenna set is referred to as the steady phase of the antenna selection method. Because a transmitting end and/or a receiving end are/is portable apparatuses, for example, mobile terminals, power storage of these apparatuses is limited. A calculation amount of the antenna selection method is also required to be as low as possible, and the antenna with the comparatively good performance can be accurately determined in a time as short as possible.

For example, there are two antenna selection methods: optimization driven decision (Optimization Driven Decision, ODD) and data driven prediction (Data Driven Prediction, DDP). The ODD method is solving an approximate optimal solution (Sub-Optimal Solution) by using an optimization method. The DDP method is finding a rule in a large quantity of samples, and applying the rule to an unknown new sample to determine a comparatively good antenna set. However, all current ODD algorithms need to be iterated, and such a feature cannot meet a requirement of the antenna selection method for real-time decision-making. In addition, an existing ODD algorithm and an existing DDP algorithm are excessively complex. The portable apparatus with the limited power storage can hardly load these calculation amounts.

To be applied to the portable apparatus with the limited power storage, current antenna selection methods may include a maximum SNR-based antenna selection method and a brute force algorithm-based antenna selection method.

The maximum SNR-based antenna selection method is selecting an antenna based on a signal-to-noise ratio (Signal to Noise Ratio. SNR) of each antenna. The signal-to-noise ratio is a parameter used to measure signal quality in communications technologies. A higher signal-to-noise ratio indicates comparatively good quality of a signal received by an antenna. In the maximum SNR-based antenna selection method, the antenna is selected based on this concept. For example, assuming that N antennas are disposed in a device, and an antenna set including L antennas needs to be selected from the N antennas to receive signals. In a maximum SNR-based antenna selection method, an antenna selection circuit is sequentially switched to different antenna sets, namely, N/L antenna sets, to obtain an SNR of each antenna. The L antennas with a maximum SNR are selected from the N antennas to be used as a target antenna set, so that the antenna selection circuit is switched to the target antenna set, to perform data transmission at a steady phase, for example, receive or transmit signals at the steady phase.

Therefore, the maximum SNR antenna selection-based method needs transient data transmission at N/L time points to traverse the N antennas, to obtain SNRs of the N antennas, further determine the L antennas with the maximum SNR as the target antenna set, and perform the data transmission at the steady phase by using the target antenna set. However, in the maximum SNR-based antenna selection method, only the SNR of each antenna is considered, but impact of correlation between antennas in the antenna set on signal quality is not considered. For example, an antenna with high correlation in the antenna set cannot meet spatial diversity required by an MIMO system. Consequently, the determined target antenna set cannot better reflect overall performance of the MIMO system.

The brute force algorithm-based antenna selection method is determining all corresponding non-repeated antenna sets in N antennas disposed in a device. Each antenna set includes L antennas. In other words, the L antennas are selected from the N antennas. There are a total of $C_N^L$ combination manners corresponding to $C_N^L$ antenna sets. A channel capacity of each of the $C_N^L$ antenna sets is calculated. An antenna set with a maximum channel capacity is selected to be used as a target antenna set. The target antenna set is configured to perform data transmission at a steady phase. However, a calculation amount in the brute force algorithm-based antenna selection method is large. When all antenna sets are transiently traversed, there is a high probability of an antenna set with comparatively poor performance. Consequently, data transmission performance is suddenly deteriorated.

However, the embodiments of this application provide an antenna selection method with a comparatively small calculation amount. The antenna selection method is applied to a portable apparatus with limited power storage, and can avoid sudden deterioration of data transmission performance to some extent while the data transmission performance of an antenna set is more objectively evaluated.

The following describes the antenna selection method in the embodiments of this application with reference to the accompanying drawings.

The antenna selection method m the embodiments of this application may be applied to a transmitting end and a receiving end. The transmitting end is an apparatus that is deployed in a radio access network and that is configured to provide a wireless communication function for a receiving end. For example, the transmitting end may be an access point (access point, AP) in Wi-Fi, or a base station in cellular communication. In addition, in the embodiments of this application, a sending node is collectively referred to as a network device. The network device may be an entity that is on a network side and that is configured to send or receive information. For example, the network device may be a base station, a transmission point (transmission point, TP), a transmission reception point (transmission and reception point, TRP), a relay device, another network device having a base station function, or the like. This is not limited in this application. Correspondingly, the receiving end may be a station supporting Wi-Fi or a device supporting cellular communication. For example, the receiving end may be a handheld device, a vehicle-mounted device, a wearable device, a computing device with a wireless communication function, another processing device connected to a wireless modem, or the like. A terminal device may have different names in different networks, for example, a terminal (terminal) device, user equipment (user equipment, UE), a mobile station, a subscriber unit, a relay (Relay), a station, a cellular phone, a personal digital assistant, a wireless modem, a wireless communications device, a handheld device, a laptop computer, a cordless phone, and a wireless local loop station.

Processes in which the transmitting end and the receiving end perform the antenna selection method in the embodiments of this application are roughly similar. Therefore, the following describes the antenna selection method provided in the embodiments of this application from a perspective of the receiving end with reference to the accompanying drawings.

In the embodiments of this application, N is an integer greater than 2. $L_1$ is an integer greater than or equal to 1 and less than L. L is an integer greater than or equal to 2. $M_1$ is an integer greater than or equal to 1. $M_2$ is an integer greater than or equal to 2. $N_1$ is an integer greater than or equal to 2. $L_2+L_1=L$. $M_3$ is an integer greater than or equal to 1. $M_4$ is an integer greater than or equal to 1. In addition, terms "including", "having", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiments may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

In an optional implementation, different from that in the foregoing implementation in which the antenna selection method is described by using the finite state machine, in this implementation, how to determine a target antenna set used in data transmission within preset-duration may be directly described. In other words, a transient phase or an initial phase is a process of determining the target antenna set. A steady phase is a phase in which the determined target antenna set is configured to perform the data transmission within preset-duration. Therefore, in subsequent descriptions of the embodiments of this application, the finite state machine may not be used for description. In conclusion, no matter which manner is used to describe the embodiments of this application, this is intended to explain how to determine the target antenna set, and does not constitute a limitation on the embodiments of this application.

The antenna selection method in the embodiments of this application may be performed in a plurality of scenarios. For example, when a device needs to perform data transmission, the antenna selection method may be used to select a target antenna set with comparatively good performance to perform data transmission within preset-duration. The preset duration may be determined based on duration of the transmitted data or may be determined in another signaling indication manner. For another example, when a device is switched from a first service to a second service, and a quantity of antennas configured to transmit service data changes or required transmission performance changes, the antenna selection method described in the embodiments of this application may be used to determine a target antenna set, to perform data transmission of the second service. For example, the first service is a text transmission service, and the second service is a video communication service. Because the two services have different requirements on data transmission reliability, required transmission performance is also different. Generally, the second service has a higher requirement on transmission performance, and a multi-antenna diversity communication manner needs to be used to improve reliability. In this case, the antenna selection method in the embodiments of this application may be used to determine the target antenna set. Optionally, a quantity of antennas in the target antenna set may be determined based on measured channel state information or a signaling indication manner.

Figure 4:
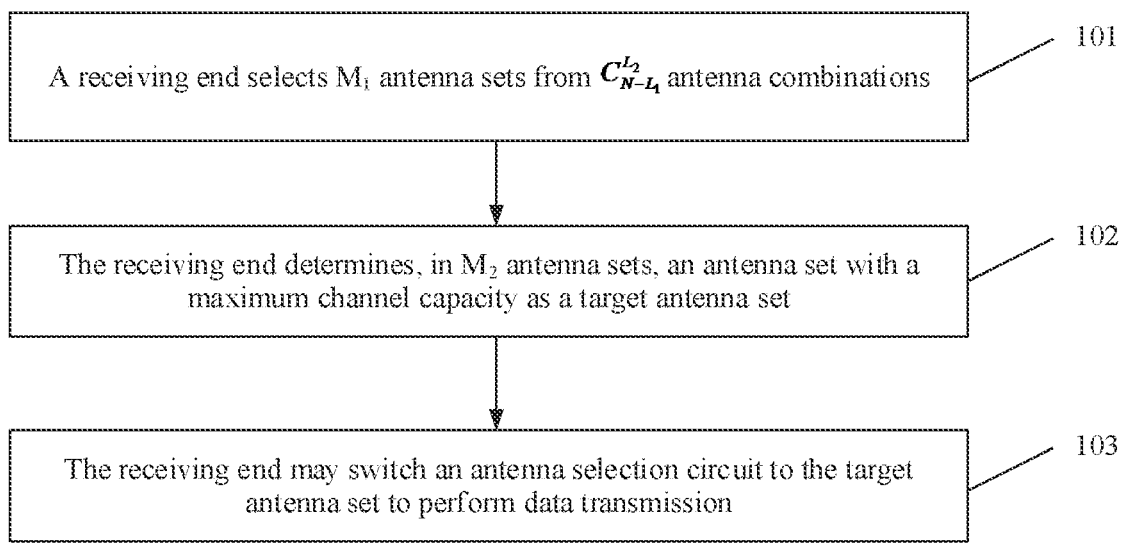
FIG. 4 is a schematic flowchart of an antenna selection method according to an embodiment of this application.

Referring to FIG. 4, FIG. 4 is a schematic flowchart of an antenna selection method according to an embodiment of this application. The antenna selection method shown in FIG. 4 is performed by a receiving end. N antennas are deployed at the receiving end, and L antennas need to be selected from the N antennas to perform data transmission. The N antennas include $L_1$ reserved antennas. In this embodiment of this application, the $L_1$ reserved antennas are $L_1$ antennas with a maximum SNR in a target antenna set used in previous data transmission within preset-duration. As shown in FIG. 4, the antenna selection method may include the following steps.

S101: The receiving end selects $M_1$ antenna sets from $C_{N-L_1}^{L_2}$ antenna combinations.

S102: The receiving end determines, in $M_2$ antenna sets, an antenna set with a maximum channel capacity as a target antenna set, where the $M_2$ antenna sets are antenna sets formed by the $M_1$ antenna sets and the $L_1$ reserved antennas, and $M_1$ is equal to $M_2$.

$C_{N-L_1}^{L_2}$ represents a quantity of combinations each including $L_2$ different antennas that are selected from N-$L_1$ antennas except the $L_1$ reserved antennas in the N antennas each time. In other words, each of the $M_1$ antenna sets includes $L_2$ antennas, where $L_1$ is a quantity of the reserved antennas, and a sum of $L_1$ and $L_2$ is equal to L.

In this way, compared with the conventional technology in which there are a total of $C_N^L$ combinations for L antennas merely selected from N antennas, this embodiment of this application fixes the $L_1$ reserved antennas in each combination. Therefore, the $M_2$ antenna sets have a maximum of $C_{N-L_1}^{L-L_1}$ (namely, $C_{N-L_1}^{L_2}$) combinations. It can be learned that in this implementation, each combination includes the $L_1$ reserved antennas with a comparatively large SNR. Therefore, a probability of sudden performance deterioration caused by an antenna set in which all antennas have poor performance, in the combined antenna sets. In addition, compared with the conventional technology in which the $C_N^L$ combinations are obtained through merely combination, this implementation has the maximum of $C_{N-L_1}^{L-L_1}$ combinations. Therefore, calculation complexity is reduced.

Optionally, $L_1$ may be a value of L/2. In this way, it can be ensured that at least half of antennas in each of the determined $M_1$ antenna sets includes are the reserved antennas, and this further reduces the probability of sudden performance deterioration in the antenna set to which an antenna selection circuit is switched.

For example, if 12 antennas are deployed at the receiving end, four antennas need to be selected from the 12 antennas to perform data transmission. That is, L is equal to 4, and $L_1$ may be 2. In the conventional technology, the four antennas are randomly selected from the 12 antennas, and there are $C_{12}^4$ antenna sets. However, in the foregoing implementation, the two reserved antennas exist in each combination. Therefore, two antennas are selected from remaining 10 antennas, and there are $C_{10}^2$ combinations. It can be learned that, compared with that in the conventional technology, a quantity of antenna sets for which channel capacities need to be measured can be reduced, and calculation complexity is reduced. In addition, because each combination has the two reserved antennas, when an antenna selection circuit is switched to each combination to calculate a channel capacity, sudden data transmission performance deterioration caused by comparatively poor performance of an antenna set to which the antenna selection circuit is switched in a switching process may be greatly reduced.

It can be learned that some antennas in the target antenna set are still some antennas in the target antenna set used in previous preset duration. In other words, the reserved antennas in the target antenna set are from the target antenna set used in the previous preset duration. Some better antennas can be found by using the $M_1$ antenna sets, to replace the target antenna set used in previous preset duration. Therefore, the data transmission performance is improved in real time while the sudden performance deterioration is avoided.

S103: The receiving end may switch the antenna selection circuit to the target antenna set to perform data transmission.

In this embodiment of this application, the antenna selection circuit may alternatively be another circuit or apparatus configured to connect an antenna set to a signal processing module such as a radio frequency channel. This is not limited in this embodiment of this application.

It can be learned that the channel capacity is used as an indicator to select the target antenna set in the antenna selection method provided in this embodiment of this application. Compared with an SNR of each antenna that a maximum SNR-based antenna selection method only considers, the channel capacity can be used to more objectively evaluate the data transmission performance of the antenna set. In addition, although a channel capacity is also used as an indicator to select a target antenna set in a brute force algorithm-based antenna selection method, all antenna sets need to be traversed to determine an antenna set with a maximum channel capacity in the brute force algorithm-based antenna selection method. There is a high probability that an antenna set with very poor performance is selected during traversal. Consequently, sudden deterioration of data transmission performance is caused. However, in the antenna selection method provided in this embodiment of this application, the $M_2$ candidate antenna sets can be determined from the N antennas based on the reserved antennas. The $M_2$ candidate antenna sets are traversed to obtain the antenna set with the maximum channel capacity. The reserved antennas are $L_1$ antennas with a maximum SNR in an antenna set with a maximum channel capacity, in $M_3$ initially set antenna sets with stable performance, or are the $L_1$ antennas with the maximum SNR in the target antenna set used in the previous determined preset-duration data transmission. This ensures that the $M_2$ candidate antenna sets include the antennas with comparatively good quality in history. Therefore, the probability of the antenna set with very poor performance in the $M_2$ antenna sets is greatly reduced, and further, the sudden deterioration of the data transmission performance can be avoided to some extent.

Figure 5:
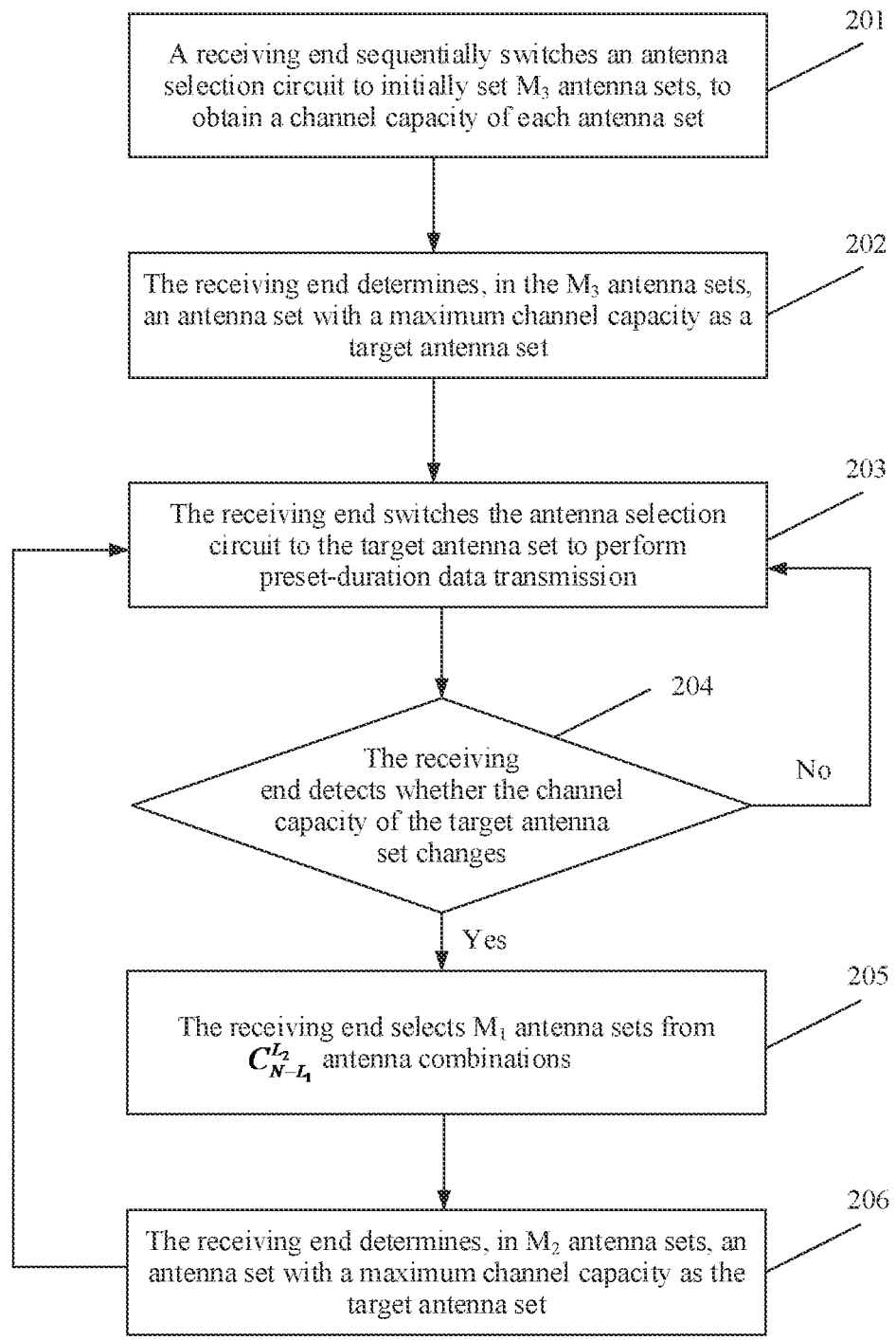
FIG. 5 is a schematic diagram of a finite state machine for an antenna selection method according to an embodiment of this application.

Referring to FIG. 5, FIG. 5 is a schematic flowchart of another antenna selection method according to an embodiment of this application. In the antenna selection method shown in FIG. 5, when a target antenna set has not been determined before, for example, when the antenna selection method is performed initially, the target antenna set may be determined from $M_3$ initially set antenna sets. When a channel capacity of the target antenna set changes in a process of performing data transmission by using the target antenna set, the antenna selection method shown in FIG. 4 is used. Specifically, the antenna selection method shown in FIG. 5 may include the following steps.

S201: A receiving end sequentially switches an antenna selection circuit to the $M_3$ initially set antenna sets, to obtain a channel capacity of each antenna set.

S202: The receiving end determines, in the $M_3$ antenna sets, an antenna set with a maximum channel capacity as the target antenna set.

S203: The receiving end switches the antenna selection circuit to the target antenna set to perform data transmission.

In this embodiment of this application, the $M_3$ antenna sets are preset antenna sets with stable performance at the receiving end. Optionally, the $M_3$ antenna sets with stable performance may be obtained through a pre-test.

Optionally, in the step S203, the receiving end may perform data transmission within preset-duration by using the target antenna set until preset duration Ts arrives. In other words, duration for the data transmission performed by using the target antenna set is Ts. The target antenna set needs to be determined again based on channel state information of each antenna when the preset duration arrives. For example, when the Ts arrives, the steps S101 and S102 shown in FIG. 4 may be performed.

S204: The receiving end detects whether the channel capacity of the target antenna set changes. If the channel capacity of the target antenna set changes, steps S205 and S206 (namely, the steps S101 and S102) are performed, and the target antenna set is determined again to perform data transmission; or if the channel capacity of the target antenna set does not change, the step S203 of performing data transmission by using the target antenna set until the preset duration Ts arrives is still performed.

For related descriptions of the steps S205 and S206, refer to the steps S101 and S102 shown in FIG. 4. Details are not described herein again.

For example, when the channel capacity suddenly changes because a user holds the receiving end or due to another reason, the data transmission by using the target antenna set is terminated in advance. The target antenna set is determined again in time to maintain good transmission performance.

Optionally, that the receiving end detects whether the channel capacity of the target antenna set changes may include. The receiving end determines a channel capacity of the target antenna set at Ts/2. The receiving end determines channel capacities of the target antenna set for a plurality of times after Ts/2. If the channel capacities determined by the receiving end for the plurality of times after Ts/2 are all less than the channel capacity determined by the receiving end at Ts/2, it indicates that performance of the target antenna set is poor. The steps S101 and S102 shown in FIG. 4 may be performed to determine the target antenna set again.

For example, if the channel capacities determined by the receiving end for the plurality of times after Ts/2 are all less than a 0.85 of the channel capacity determined by the receiving end at Ts/2, the target antenna set may be determined again in advance. If not all the channel capacities determined by the receiving end for the plurality of times after Ts/2 are less than the 0.85 of the channel capacity determined by the receiving end at Ts/2, a next target antenna set may be determined when Ts arrives.

After operations in the steps S101 and S102 are performed again to determine the target antenna set based on the target antenna set used in the previous preset duration, data transmission is performed again by using the target antenna set based on the target antenna set.

It can be learned that, in the antenna selection method shown in FIG. 5, when the target antenna set is initially determined, the target antenna set is determined in the preset antenna set with stable performance. Therefore, a probability of sudden performance deterioration in a switching process can be reduced. When the channel capacity of the determined target antenna set changes and the target antenna set is determined again, because each of $M_2$ antenna sets includes $L_1$ reserved antennas, the probability of the sudden performance deterioration in the switching process can also be reduced. Therefore, while the antenna selection method shown in FIG. 5 is used to determine the antenna set with comparatively good performance, the probability of the sudden performance deterioration can be further reduced.

In another optional implementation, when the target antenna set is initially determined, operations in the steps S101 and S102 may be further used to determine the target antenna set. Specifically, in the steps S201 and S202, the receiving end may determine, in the $M_3$ antenna sets, the antenna set with the maximum channel capacity, select, from the antenna set with the maximum channel capacity, $L_1$ antennas with a maximum SNR as reserved antennas, and determine the target antenna set by performing the foregoing operations in the steps S101 and S102 based on the $L_1$ reserved antennas.

In still another optional implementation, a difference from the foregoing implementation lies in that, when the target antenna set is initially determined, the used reserved antennas may alternatively be $L_1$ antennas with a maximum SNR in N antennas disposed at a receiving end. The preset $M_3$ antenna sets with stable performance are antenna sets that can be configured to traverse the N antennas. In other words, the antenna selection circuit is sequentially switched to the $M_3$ antenna sets with stable performance to obtain an SNR of each antenna in the N antennas.

It can be learned that the foregoing implementations of initially determining the target antenna set are all determined based on the preset antenna set with stable performance. This can reduce the probability of the sudden performance deterioration in the switching process.

Figure 6:
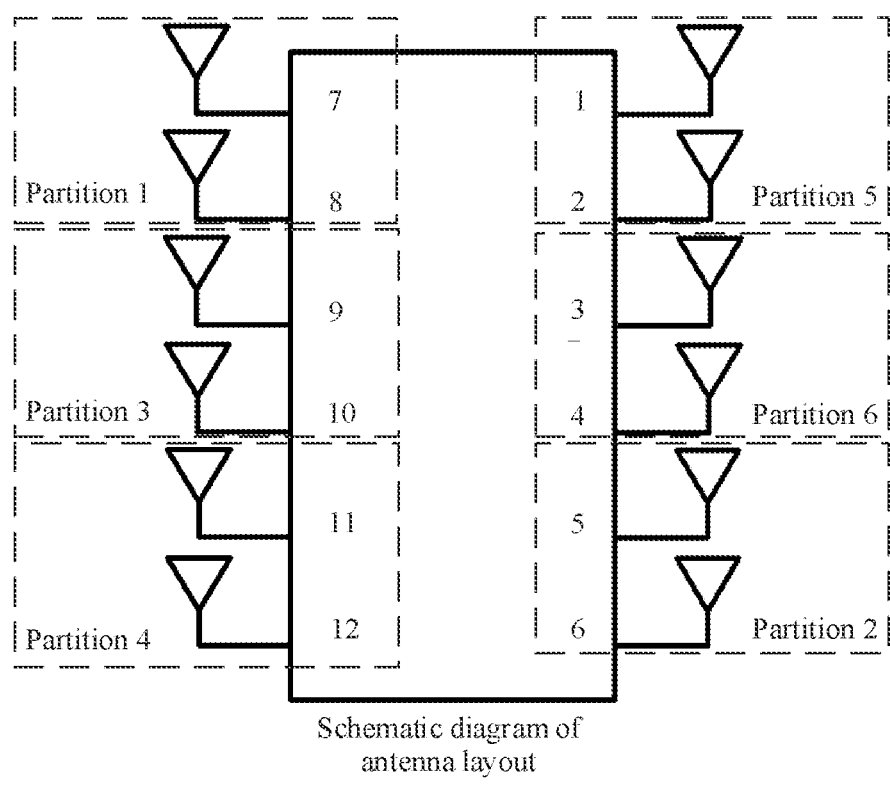
FIG. 6 is a schematic diagram of partitions of 12 antennas deployed at a receiving end according to an embodiment of this application.

In an optional implementation, in antenna selection methods in FIG. 4 and FIG. 5, the receiving end may further partition the N antennas based on correlation between the N antennas deployed at the receiving end, to obtain $N_1$ partitions. Each partition may include at least two antennas. For example, referring to FIG. 6, FIG. 6 is a schematic diagram of partitions of 12 antennas deployed at a receiving end according to an embodiment of this application. As shown in FIG. 6, the 12 antennas are deployed at the receiving end. That each partition includes two antennas is used as an example. Based on distances between the antennas, the 12 antennas are divided into six partitions.

Further, that the receiving end selects the $M_1$ antenna sets from $C_{N-L_1}^{L_2}$ antenna combinations based on the $N_1$ partitions corresponding to the N antennas includes:

The receiving end selects the $M_1$ antenna sets from $C_{N_1}^{L_2} L_2 C_{L_3}^{1}$ antenna combinations.

$C_{N_1}^{L_2} (C_{L_3}^{1} \ldots C_{L_3}^{1})_{L_2}$ represents a quantity of antenna combinations each including an antenna that is selected from $L_3$ antennas included in each of $L_2$ partitions selected in the $N_1$ partitions each time. $(C_{L_3}^{1} \ldots C_{L_3}^{1})_{L_2}$ represents multiplying $L_2 C_{L_3}^{1}$.

In other words, in this implementation, the $M_1$ antenna sets are determined through combination based on a partition. To be specific, $L-L_1$ (namely, $L_2$) antennas in each antenna set are separately selected from the $N_1$ partitions. Based on comparatively high correlation between antennas in each partition, selecting one antenna from a partition can represent features of the antennas in the partition. Therefore, the $M_1$ antenna sets can be configured to traverse one antenna in each partition. Compared with a brute force algorithm-based antenna selection method, the method can be used to reduce a quantity of to-be-considered antenna sets. In other words, a value of $M_1$ is comparatively small, and algorithm complexity can be further reduced.

For example, as shown in FIG. 6, one antenna is separately selected from any two partitions in the six partitions, and is combined with two reserved antennas. There is a total of $C_6^2 C_2^1 C_2^1$ antenna sets. The receiving end separately determines a channel capacity of an antenna set formed by each antenna set and the reserved antennas, and determines an antenna set with a maximum channel capacity as a target antenna set. However, in the brute force algorithm-based antenna selection method, $C_{12}^4$ antenna combinations are required. In other words, channel capacities of 3960 antenna sets are required to determine the target antenna set. Therefore, the algorithm complexity can be greatly reduced in this implementation.

In an optional implementation, the receiving end may determine primary exploration partitions from the $N_1$ partitions, and determine the $M_1$ antenna combinations based on the primary exploration partitions, to further reduce algorithm complexity. The following describes this implementation.

That the receiving end selects the $M_1$ antenna sets from $C_{N_1}^{L_2} (C_{L_3}^{1} \ldots C_{L_3}^{1})_{L_2}$ antenna combinations may include:
The receiving end determines, in partitions except $N_3$ reserved partitions in the $N_1$ partitions, partitions with the largest distance from the N3 reserved partitions to be used as the primary exploration partitions in the $N_1$ partitions. The $N_3$ reserved partitions are $N_3$ partitions including the reserved antennas, in the $N_1$ partitions. The receiving end determines the $M_1$ antenna sets based on antennas m the $N_3$ reserved partitions and antennas in the primary exploration partitions. In other words, the receiving end selects the $M_1$ antenna sets from the $C_{N_2}^{L_2} (C_{L_3}^1 \ldots C_{L_3}^1)_{L_2}$ antenna combinations. $C_{N_2}^{L_2} (C_{L_3}^1 \ldots C_{L_3}^1)_{L_2}$ represents a quantity of antenna combinations each including an antenna that is selected from each of $L_3$ antennas included in each of $L_2$ partitions randomly selected in $N_2$ primary exploration partitions. It can be learned that in this implementation, the partitions with the largest distance from the reserved partitions are used as the primary exploration partitions, so that antennas in the $M_2$ antenna sets have spatial diversity. This is conducive to performance of an MIMO system. Further, in this implementation, the complexity is reduced while it can ensure that a comparatively good antenna set can be selected.

Figure 7:
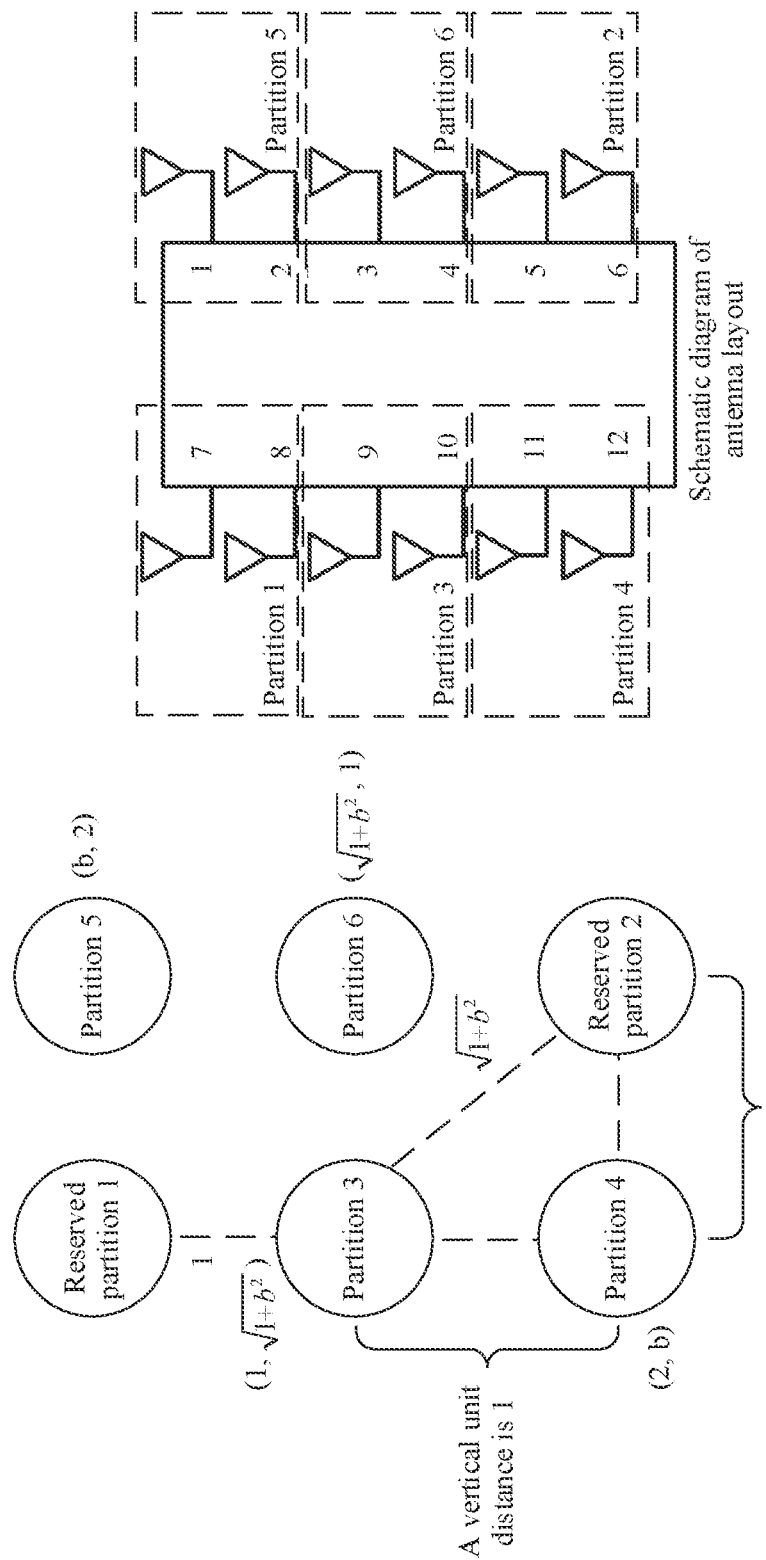
FIG. 7 is a schematic diagram of other partitions corresponding to FIG. 6 according to an embodiment of this application.

For example, as shown in FIG. 6, it is assumed that a target antenna set used in previous preset duration is antenna numbers 3, 6, 7, and 9, reserved antennas are antenna numbers 6 and 7, and corresponding reserved partitions are respectively a partition in which antenna numbers 5 and 6 are located and a partition in which antenna numbers 7 and 8 are located, namely, a reserved partition 1 and a reserved partition 2 in FIG. 7. As shown in FIG. 6 and FIG. 7, other partitions except the reserved partitions are respectively a partition 3 in which antenna numbers 9 and 10 are located, a partition 4 in which antenna numbers 11 and 12 are located, a partition 5 in which antenna numbers 1 and 2 are located, and a partition 6 in which antenna numbers 3 and 4 are located in FIG. 6. As shown in FIG. 7, assuming that a horizontal unit distance between partitions is b, and a vertical unit distance between partitions is 1. Distances between each partition and the reserved partitions may be: A distance between the partition 3 and the reserved partition 1 is 1. A distance between the partition 3 and the reserved partition 2 is $\sqrt{1+b^2}$. Therefore, distances between the partition 3 and the reserved partitions are $(1, \sqrt{1+b^2})$. A distance between the partition 4 and the reserved partition 1 is 2, and a distance between the partition 4 and the reserved partition 2 is b. Therefore, distances between the partition 4 and the reserved partitions are (2, b). By analogy, distances between the partition 5 and the reserved partitions are (b, 2). Distances between the partition 6 and the reserved partitions are $(\sqrt{1+b^2}, 1)$. Therefore, as shown in Table 1, the distances between each partition and the reserved partitions are as follows.

TABLE 1

| Other partitions | Reserved partitions 1 and 2 |
|---|---|
| Partition 3 | $(1, \sqrt{1 + b^2})$ |
| Partition 4 | (2, b) |
| Partition 5 | (b, 2) |
| Partition 6 | $(\sqrt{1 + b^2}, 1)$ |

It can be learned that, as shown in Table 1, partitions 4 and 5 with the largest distance from the reserved partitions. Therefore, the partitions 4 and 5 are primary exploration partitions, and the reserved partitions 1 and 2 may be combined with the primary exploration partitions 4 and 5 to obtain $M_2$ antenna sets. This greatly reduces algorithm complexity.

In another optional implementation, the receiving end considers both impact of an antenna deployment distance on transmission performance of the target antenna set, and impact of the target antenna set used in previous preset duration on determining the target antenna set again. In particular, when the channel capacity of the target antenna set changes and the target antenna set is determined again, the change of the channel capacity may be caused by poor performance of other antennas except the reserved antennas with a maximum SNR in the target antenna set. Correspondingly, there is a comparatively high probability that performance of partitions in which these antennas are located is also poor. Therefore, in this implementation, a probability that these partitions are in the $M_2$ antenna sets may be reduced based on this. The following describes this implementation.

Optionally, that the receiving end selects the $M_1$ antenna sets from $C_{N_2}^{L_2} (C_{L_3}^1 \ldots C_{L_3}^1)_{L_2}$ antenna combinations may include: The receiving end sets a first weight for each of other partitions, based on distances between $N_3$ reserved partitions and the other partitions except the $N_3$ reserved partitions in the $N_1$ partitions. The distance is in direct proportion to the first weight, and the $N_3$ reserved partitions are $N_3$ partitions including the reserved antennas, in the $N_1$ partitions. The receiving end sets a second weight for each of the other partitions based on partitions where antennas in the target antenna set used in the previous data transmission within preset-duration belong to. Second weights for partitions where antennas in the target antenna set used in the previous data transmission within preset-duration belong to, are less than second weights for partitions where antennas in a target antenna set not used in the previous data transmission within preset-duration belong to. The receiving end determines in the other partitions, partitions with the largest sum of the first weight and the second weight as primary exploration partitions. The receiving end selects the $M_1$ antenna sets from the $C_{N_2}^{L_2} (C_{L_3}^1 \ldots C_{L_3}^1)_{L_2}$ antenna combinations. $N_2$ is a quantity of primary exploration partitions in the $N_1$ partitions. It can be learned that in this implementation, the first weight and the second weight are set for each partition based on the distances between the partitions and the reserved partitions and whether the partitions are the partitions in which the antennas used in the previous target antenna set are located. In this way, the primary exploration partitions are determined based on the first weights and the second weights of the other partitions except the reserved partitions. Compared with the foregoing implementation in which only the distances are considered, a probability that the $M_2$ antenna sets include an antenna set with the best performance can be further increased.

For example, as shown in FIG. 6 and FIG. 7, the distances between each partition and the reserved partitions are used as a first weight for each partition. For example, if the distance between the partition 3 and the reserved partition 1 is 1, and the distance between the partition 3 and the reserved partition 2 is $\sqrt{1+b^2}$, a first weight for the partition 3 is $(1, \sqrt{1+b^2})$. If the distance between the partition 4 and the reserved partition 1 is 2, and the distance between the partition 4 and the reserved partition 2 is b, a first weight for the partition 4 is (2, b). By analogy, a first weight for the partition 5 is (b, 2). A first weight for the partition 6 is $(\sqrt{1+b^2}, 1)$. Therefore, as shown in Table 2, the first weight for each partition is as follows.

TABLE 2

| Other partitions | First weight |
| --- | --- |
| Partition 3 | $(1, \sqrt{1 + b^2})$ |
| Partition 4 | $(2, b)$ |
| Partition 5 | $(b, 2)$ |
| Partition 6 | $(\sqrt{1 + b^2}, 1)$ |

Further, the receiving end determines that the target antenna set used in previous data transmission within preset-duration is the antenna numbers 3, 6, 7, and 9, the reserved antennas are antenna numbers 6 and 7, and partitions including antenna numbers 3 and 9 are the partition 3 and the partition 6 respectively. Therefore, second weights for the partition 3 and the partition 6 needs to be less than second weights for partitions 4 and 5. For example, it is assumed that the second weights for the partitions 4 and 5 are 0, and the second weights for the partitions 3 and 6 are negative first weights. Alternatively, it is assumed that the second weights for the partitions 4 and 5 are 0, and the second weights for the partitions 3 and 6 are values that enable weights for the partitions 3 and 6 to be 0. Therefore, in FIG. 6, partitions with the maximum sum of the first weight and the second weight are the partition 4 and the partition 5. In other words, the partition 4 and the partition 5 are primary exploration partitions.

Optionally, the receiving end may set second weights for partitions that are in partitions except the reserved partitions and that belong to the primary exploration partitions used when the previous target antenna set is determined. The second weight is used to set a weight for the partition to the smallest value. It can be learned that in this implementation, antennas in non-primary exploration partitions in a previous transient mode can be preferentially explored, to avoid re-selecting antennas with poor performance that cause the channel capacity change in the previous primary exploration partitions.

In an optional implementation, when selecting the $M_1$ antenna sets based on the antennas in the primary exploration partitions, the receiving end may further specifically determine the $M_1$ antenna sets based on correlation between each antenna in the primary exploration partitions and the reserved antennas in the reserved partition, to increase spatial diversity of the antenna sets. The following describes this implementation.

That the receiving end selects the $M_1$ antenna sets from $C_{N_2}^{L_2} L_2 C_{L_3}^1$ antenna combinations includes: The receiving end determines $L_2$ antennas that are in the $N_2$ primary exploration partitions and that are most correlated with the reserved antennas in the $N_3$ reserved partitions, to form the farthest set of the $N_2$ primary exploration partitions. The receiving end determines $L_2$ antennas that are in the $N_2$ primary exploration partitions and that are least correlated with the reserved antennas in the $N_3$ reserved partitions, to form the nearest set of the $N_2$ primary exploration partitions. The receiving end combines the $L_1$ reserved antennas with the farthest set of the primary exploration partitions and the nearest set of the primary exploration partitions, to obtain $M_4$ antenna sets. The receiving end sequentially switches the antenna selection circuit to the $M_4$ antenna sets, to obtain SNRs of each reserved antenna and each antenna in the $N_2$ primary exploration partitions. The receiving end selects, in the $N_2$ primary exploration partitions, $L_2$ antennas with a maximum SNR as a first antenna set with the maximum SNR The $M_1$ antenna sets include the farthest set of the $N_2$ primary exploration partitions, the nearest set of the $N_2$ primary exploration partitions, and the first antenna set with the maximum SNR.

It can be learned that, in this implementation, the farthest set of the primary exploration partitions, the nearest set of the primary exploration partitions, and the antennas with the maximum SNR in the primary exploration partitions may be combined with the reserved antennas to form the $M_2$ antenna sets. This further reduces algorithm complexity.

Figures 2, 8A:
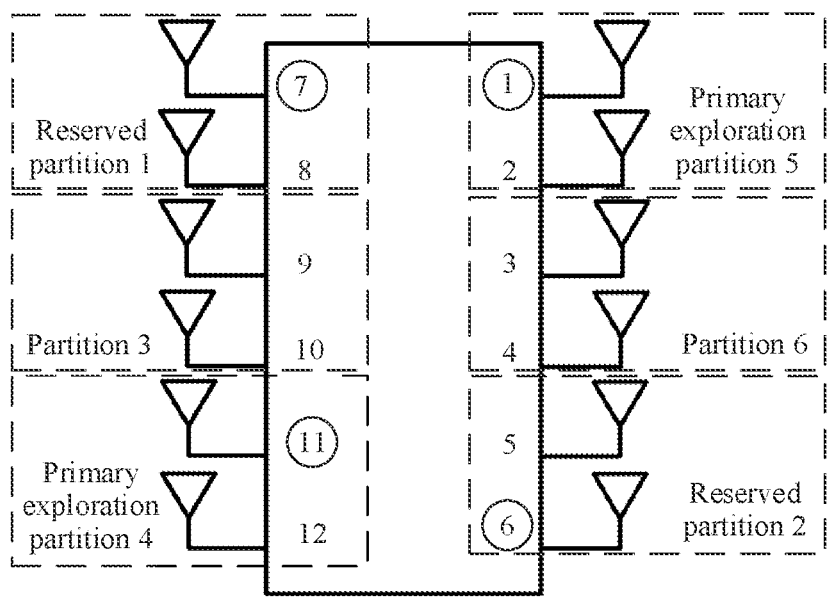

For example, the primary exploration partitions shown in FIG. 7 are respectively the partition 4 and the partition 5, and correspond to the antenna numbers 11 and 12 and the antenna numbers 1 and 2 shown in FIG. 6. Antennas that are in the primary exploration partitions 4 and 5 and that are least correlated with the reserved antennas 6 and 7 in reserved partitions are antenna numbers 1 and 12. In other words, the farthest set of the primary exploration partitions 4 and 5 is the antenna numbers 1 and 12. Correspondingly, antennas that are in the primary exploration partitions 4 and 5 and that are most correlated with the reserved antennas 6 and 7 are antenna numbers 2 and 11. In other words, the nearest set of the primary exploration partitions 4 and 5 is the antenna numbers 2 and 11. Then, the farthest set of the primary exploration partitions and the nearest set of the primary exploration partitions are combined with the reserved antennas 6 and 11. Obtained $M_4$ antenna sets are {6, 7, 1, 12} and {6, 7, 2, 11} respectively. When the antenna selection circuit is switched to the two sets to obtain channel capacities, SNRs of all antennas, namely, the antennas 1, 12, 2, and 11, in the primary exploration partitions, may further obtained. Therefore, $L_2$ antennas with a maximum SNR, namely, two antennas, may be selected from the two sets. It is assumed that the $L_2$ antennas are 1 and 11. In this case, the two antennas with the maximum SNR in the primary exploration partitions may be used as a first antenna set with the maximum SNR, namely, {1, 11}. It can be learned that the $M_2$ antenna sets formed through combination with the reserved antennas are shown in FIG. 8a-1 and FIG. 8a-2, and are respectively {6, 7, 1, 12}, {6, 7, 2, 11}, and {6, 7, 1, 11}. Therefore, the antenna set with the largest channel capacity is determined as the target antenna set. This greatly reduces algorithm complexity.

In still another optional implementation, the receiving end may further explore performance of partitions except the primary exploration partitions and the reserved partitions, to determine, in the N antennas disposed at the receiving end, L antennas with a maximum SNR as a to-be-considered antenna set while avoiding sudden performance deterioration. In this embodiment of this application, in the $N_1$ partitions obtained by dividing the antennas disposed at the receiving end, the partitions except the reserved partitions and the primary exploration partitions are referred to as secondary exploration partitions. For example, the partition 3 and the partition 6 in FIG. 7 are secondary exploration partitions. In the foregoing implementation, the SNR of each antenna in the primary exploration partitions may be obtained based on the farthest set of the primary exploration partitions and the nearest set of the primary exploration partitions. For non-reserved antennas in the reserved partitions and antennas in the secondary exploration partitions, the receiving end may combine the non-reserved antennas with the antennas in the secondary exploration partitions, to obtain the SNR of each antenna through traversal. A quantity of antenna combinations each obtained by combining the non-reserved antennas with the antennas in the secondary exploration partitions is $C_{N_1-N_2-N_3}^{L_2} (C_{L_3}^1 \ldots C_{L_3}^1)_{L_2} C_{N_3}^{L_1} (C_{L_3-L_4}^1 \ldots C_{L_3-L_4}^1)_{L_1} \cdot (C_{L_3}^1 \ldots C_{L_3}^1)_{L_2}$ represents multiplying $L_2 C_{L_3}^{1} \cdot (C_{L_3-L_4}^{1} \ldots C_{L_3-L_4}^{1})_{L_1}$ represents multiplying $L_1$ $C_{L_3-L_4}^{1} \cdot C_{N_1-N_2-N_3}^{L_2} (C_{L_3}^{1} \ldots C_{L_3}^{1})_{L_2}$ represents a quantity of antenna combinations each including an antenna that is selected from each of $L_3$ antennas included in each of $L_2$ partitions selected from N1-N2-N3 non-secondary exploration partitions. $C_{N_3}^{L_1} (C_{L_3-L_4}^{1} \ldots C_{L_3-L_4}^{1})_{L_1}$ represents a quantity of antenna combinations each including an antenna that is selected from each of $L_3$-$L_4$ non-reserved antennas in each of $L_1$ reserved partitions selected from the $N_3$ reserved partitions. Correlation between non-reserved antennas and reserved antennas that are located in one partition is comparatively high. Therefore, a probability of sudden performance deterioration is reduced because of the non-reserved antennas in combined $M_5$ antenna set. Further, SNRs of the non-reserved antennas in each reserved partition and SNRs of the antennas in each secondary exploration partition may be obtained. In this way, the receiving end may obtain SNRs of all the N disposed antennas, to determine, L antennas with the maximum SNR as a second antenna set with the maximum SNR. It can be learned that, compared with that in a maximum SNR-based antenna selection method, in a process of determining the second antenna set with the maximum SNR in this implementation, the probability of the sudden performance deterioration can be reduced.

Figure 8B:
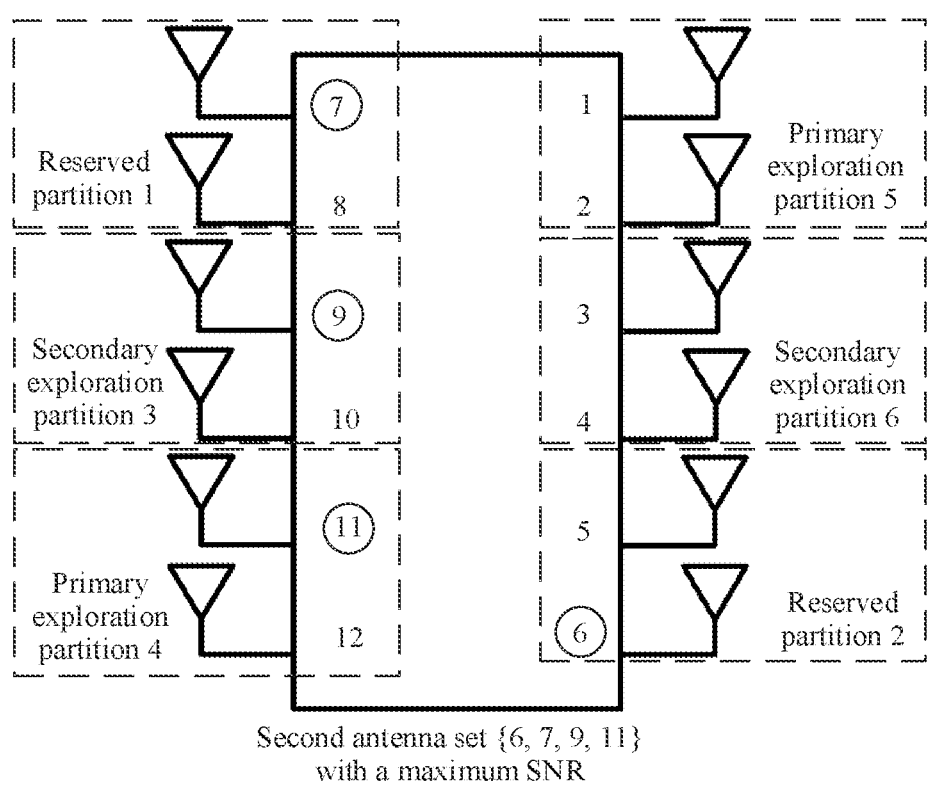
FIG. 8b is a schematic diagram of a second antenna set with a maximum SNR according to an embodiment of this application.

For example, as shown in FIG. 6, the non-reserved antennas in the reserved partitions are antenna numbers 8 and 5, and the antennas in the secondary exploration partitions 3 and 6 are antenna numbers 9, 10, 3, and 4. Therefore, the non-reserved antennas are combined with the antennas in the secondary exploration partitions to obtain an SNR of each antenna through traversal. The combined set may be {8, 5, 9, 10} and {8, 5, 3, 4}. Then, the antenna selection circuit is switched to the two sets, to obtain SNRs of antennas in all the secondary exploration partitions. With reference to the farthest set of the primary exploration partitions and the nearest set of the primary exploration partitions in the foregoing implementation, the SNR of each antenna shown in FIG. 6 may be obtained, so that the four antennas with the maximum SNR may be determined as a second antenna set with the maximum SNR. It is assumed that, as shown in FIG. 8b, compared with that in FIG. 8a-1 and FIG. 8a-2, one second antenna set {7, 9, 11, 6} with a maximum SNR may be further added. In this way, the $M_2$ antenna sets are respectively {6, 7, 1, 12} corresponding to the farthest set of the primary exploration partitions, {6, 7, 2, 11} corresponding to the nearest set of the primary exploration partitions, {6, 7, 1, 11} corresponding to the first antenna set with the maximum SNR, and {7, 9, 11, 6} corresponding to the second antenna set with the maximum SNR.

The foregoing describes optional implementations of determining the $M_1$ antenna sets. Compared with that in the conventional technology, in the foregoing implementations, the algorithm complexity can be reduced while it is ensured that the better antenna set is selected. Therefore, the antenna selection method described in this application is more applicable to a device having a comparatively limited electric energy and computing capability, such as a mobile apparatus.

Figure 9:
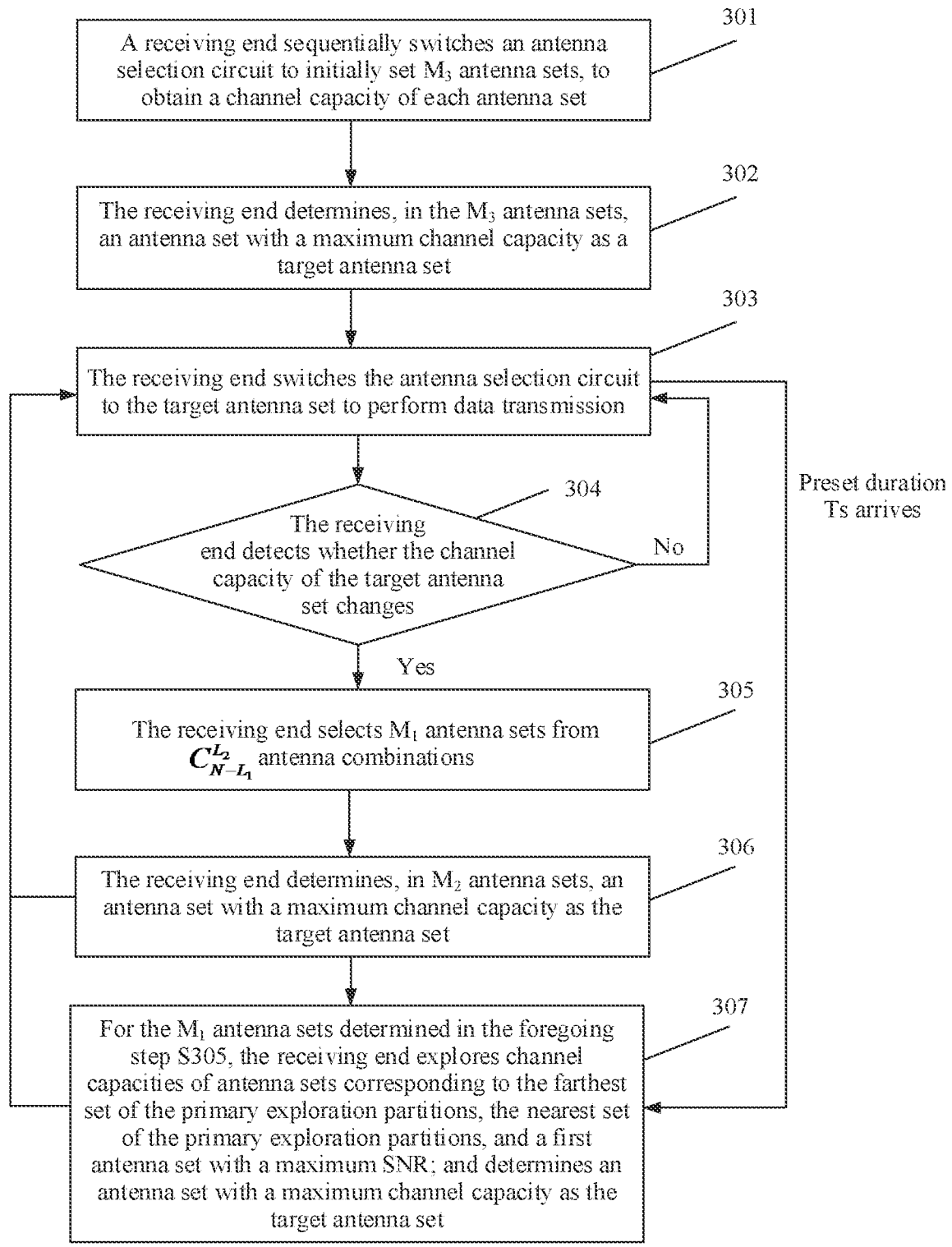
FIG. 9 is a schematic diagram of a finite state machine for another antenna selection method according to an embodiment of this application.

Referring to FIG. 9, FIG. 9 is a schematic flowchart of another antenna selection method according to an embodiment of this application. A difference between the antenna selection method shown in FIG. 9 and the antenna selection method shown in FIG. 5 lies in that: In the antenna selection method shown in FIG. 9, when a receiving end detects, within preset duration, that a channel capacity changes, the foregoing implementations may be used again to determine a target antenna set, or when a receiving end detects, within preset duration, that the channel capacity does not change, namely, when the preset duration Ts arrives, there is no need to use the method described in the foregoing implementations to determine $M_1$ antenna sets, but the receiving end explores a channel capacity of each of antenna sets (namely, antenna sets obtained by combining the $M_1$ antenna sets and $L_1$ reserved antennas) corresponding to the farthest set of primary exploration partitions corresponding to a target antenna set used in previous preset duration, the closest set of the primary exploration partitions corresponding to the target antenna set used in the previous preset duration, and a first antenna set with a maximum SNR, and a channel capacity of a second antenna set with a maximum SNR again to determine a target antenna set. Wherein, the farthest set and the closest set of the primary exploration partitions corresponding to the target antenna set, and the antenna set with the maximum SNR, are antenna sets in the $M_1$ antenna sets corresponding to the target antenna set.

In other words, in this implementation, when the receiving end detects that the channel capacity changes, the foregoing implementations are used to determine the $M_1$ antenna sets, to obtain the target antenna set. When the receiving end detects that the channel capacity does not change but the preset duration Ts arrives, it indicates that a state of the target antenna set is comparatively stable, and there is no need to determine the $M_1$ antenna sets again. Therefore, algorithm complexity can be further reduced.

As shown in FIG. 9, the antenna selection method may specifically include the following steps.

Steps S301 to S304 are similar to the steps S201 to S204 in FIG. 5, and details are not described herein again.

S304: The receiving end detects whether the channel capacity of the target antenna set changes, and if the channel capacity of the target antenna set changes, foregoing steps S305 and S306 of determining the target antenna set again to perform data transmission within preset-duration are performed; or if the channel capacity of the target antenna set does not change, the target antenna set is still configured to perform data transmission until the preset duration arrives, and steps S308 to S310 are performed.

The steps S305 and S306 are the same as the steps S101 and S102 shown in FIG. 4, and details are not described herein again.

S307: For the $M_1$ antenna sets determined in the step S305, the receiving end explores channel capacities of the antenna sets corresponding to the farthest set of the primary exploration partitions, the nearest set of the primary exploration partitions, and the first antenna set with the maximum SNR; and determines an antenna set with a maximum channel capacity as the target antenna set.

The antenna sets corresponding to the farthest set of the primary exploration partitions, the nearest set of the primary exploration partitions, and the first antenna set with the maximum SNR are antenna sets formed by combining the $L_1$ reserved antennas with the farthest set of the primary exploration partitions, the nearest set of the primary exploration partitions, and the first antenna set with the maximum SNR.

Based on the target antenna set, the step S303 is performed again to perform the data transmission within preset-duration, and the like. The steps are cyclically performed based on the foregoing operations, until the data transmission at the receiving end is completed.

In another optional implementation, the step S307 may be: For the $M_1$ antenna sets determined in the step 305, the receiving end explores channel capacities of the antenna sets corresponding to the farthest set of the primary exploration partitions, the nearest set of the primary exploration partitions, the first antenna set with the maximum SNR, and the second antenna set with the maximum SNR, and uses, in the four antenna sets, an antenna set with a maximum channel capacity as the target antenna set. Based on the target antenna set, the step S303 may be performed again to perform the data transmission, and the like. The steps are cyclically performed based on the foregoing operations, until the data transmission at the receiving end is completed.

For example, in the antenna selection method shown in FIG. 9, the antennas shown in FIG. 6 are used as an example. The $M_1$ antenna sets determined in the step S305 are the farthest set {1, 12} of the primary exploration partitions, the nearest set {2, 11} of the primary exploration partitions, the first antenna diversity {1, 11} with the maximum SNR. The $M_2$ antenna sets in step S306 are {6, 7, 1, 12} corresponding to the farthest set of the primary exploration partitions, {6, 7, 2, 11} corresponding to the nearest set of the primary exploration partitions, {6, 7, 1, 11} corresponding to the first antenna set with the maximum SNR, and {7, 9, 11, 6} corresponding to the second antenna set with the maximum SNR. The second antenna set {7, 9, 11, 6} with the maximum SNR is determined as the target antenna set. During the data transmission performed by using the target antenna set, when the receiving end detects that the channel capacity does not change but the preset duration Ts arrives, the receiving end may explore channel capacities of {6, 7, 1, 12} corresponding to the farthest set of the primary exploration partitions, {6, 7, 2, 11} corresponding to the nearest set of the primary exploration partitions, {6, 7, 1, 11} corresponding to the first antenna set with the maximum SNR, and {7, 9, 11, 6} corresponding to the second antenna diversity with the maximum SNR to determine an antenna set with a maximum channel capacity as the target antenna set. Alternatively, the receiving end may explore the channel capacities of {6, 7, 1, 12} corresponding to the farthest set of the primary exploration partitions, {6, 7, 2, 11} corresponding to the nearest set of the primary exploration partitions, {6, 7, 1, 11} corresponding to the first antenna set with the maximum SNR to determine an antenna set with a maximum channel capacity as the target antenna set.

It should be noted that, if an antenna set with a maximum channel capacity is determined in three preset fixed antenna sets to be used as the target antenna set, and when the data transmission is performed within the preset duration, and the channel capacity is not detected to be changed but the preset duration Ts arrives, the data transmission within preset-duration may be performed again based on the target antenna set, and then the steps S203 and S204 are performed. If a reserved antenna is selected from the three preset fixed antenna sets to be determined as the target antenna set with reference to the related implementation in the step S101, and when the data transmission is performed within the preset duration, and the channel capacity is not detected to be changed but the preset duration Ts arrives, the farthest set of the primary exploration partitions, corresponding to the target antenna set, the nearest set of the primary exploration partitions, corresponding to the target antenna set, and the first antenna set with the maximum SNR corresponding to the target antenna set may be configured to determine the target antenna set in the next preset duration.

Figure 10:
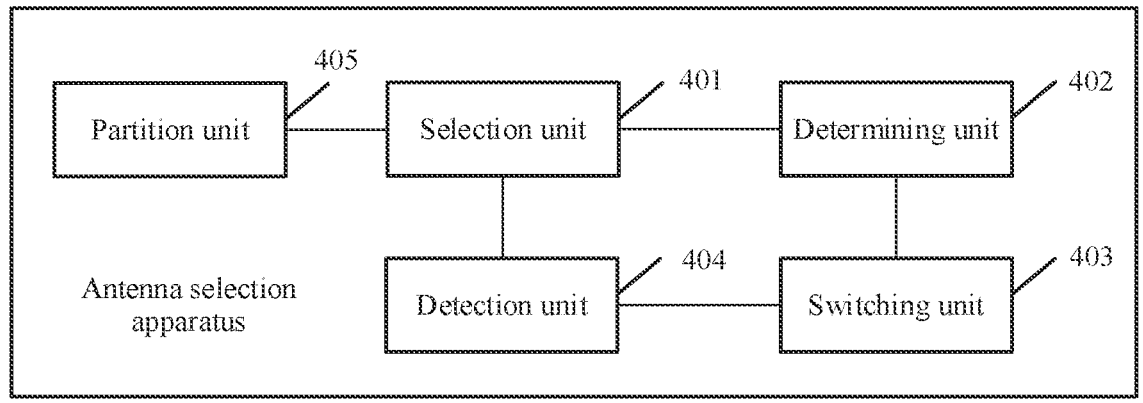
FIG. 10 is a schematic diagram of a structure of an antenna selection apparatus according to an embodiment of this application.

Referring to FIG. 10, FIG. 10 is a schematic diagram of a structure of an antenna selection apparatus according to an embodiment of this application. As shown in FIG. 10, the antenna apparatus may be disposed at the receiving end or the transmitting end in the foregoing method embodiments. Optionally, the antenna selection apparatus may include:

a selection unit 401, configured to select $M_1$ antenna sets from $C_{N-L_1}^{L_2}$ antenna combinations, where $L_1$ is a quantity of reserved antennas, and a sum of $L_1$ and $L_2$ is equal to L;

a determining unit 402, configured to determine, in $M_2$ antenna sets, an antenna set with a maximum channel capacity as a target antenna set, where the $M_2$ antenna sets are antenna sets formed by the $M_1$ antenna sets obtained by the selection unit 401 and the $L_1$ reserved antennas, and $M_1$ is equal to $M_2$; and a switching unit 403, configured to switch an antenna selection circuit to antennas in the target antenna set determined by the determining unit 402, to perform data transmission.

The $L_1$ reserved antennas are $L_1$ antennas with a maximum SNR in a target antenna set used in previous data transmission within preset-duration, N is an integer greater than 2, and L is a positive integer greater than or equal to 2 and less than N, and $M_1$, $M_2$, $L_1$, and $L_2$ are positive integers.

In an optional implementation, the apparatus further includes:

a detection unit 404, configured to: in a process of performing data transmission within preset-duration by using the target antenna set, detect whether the channel capacity of the target antenna set changes, and when detecting that the channel capacity of the target antenna set is changed, trigger the selection unit 401 to perform an operation of selecting the $M_1$ antenna sets from the $C_{N-L_1}^{L_2}$ antenna combinations.

In an optional implementation, the determining unit 402 is further configured to determine, in $M_3$ initially set antenna sets with stable performance, an antenna set with a maximum channel capacity as the target antenna set, to trigger the switching unit 403 to perform an operation of switching the antenna selection circuit to the antennas in the target antenna set, to perform the data transmission within preset-duration.

In another optional implementation, the determining unit 402 is further configured to: determine, in $M_3$ initially set antenna sets with stable performance, an antenna set with a maximum channel capacity, determine, from the determined antenna set, $L_1$ antennas with a maximum SNR as reserved antennas, and trigger, based on the $L_1$ reserved antennas, the selection unit 401 to perform an operation of selecting the $M_1$ antenna sets from the $C_{N-L_1}^{L_2}$ antenna combinations.

In an optional implementation, the selection unit 401 may obtain the $M_1$ antenna combinations based on a partition idea. For example, the apparatus further includes:

a partition unit 405, configured to partition the N antennas based on correlation between the N antennas deployed in a device, to obtain $N_1$ partitions, where each partition includes $L_3$ antennas.

That the selection unit 401 selects the $M_1$ antenna sets from the $C_{N-L_1}^{L_2}$ antenna combinations specifically includes:

selecting the $M_1$ antenna sets from $C_{N_1}^{L_2} (C_{L_2}^{1} \ldots C_{L_2}^{1})_{L_2}$ antenna combinations, where antennas except the $L_1$ reserved antennas in each antenna set belong to different partitions.

In an optional implementation, the selection unit 401 may further determine the $M_1$ antenna combinations based on an idea of primary exploration partitions. That the selection unit 401 selects the $M_1$ antenna sets from the $C_{N_1}^{L_2} (C_{L_2}^{1} \ldots C_{L_3}^{1})_{L_2}$ antenna combinations specifically includes:

determining, in other partitions except $N_3$ reserved partitions in the $N_1$ partitions, partitions with the largest distance from the $N_3$ reserved partitions as primary exploration partitions in the $N_1$ partitions, where the $N_3$ reserved partitions are $N_3$ partitions including the reserved antennas, in the $N_1$ partitions; and selecting the $M_1$ antenna sets from the $C_{N_2}^{L_2}$ $(C_{L_3}^1 \ldots C_{L_3}^1)_{L_2}$ antenna combinations, where $N_2$ is a quantity of primary exploration partitions in the $N_1$ partitions, and $N_2$ and $N_3$ are positive integers.

Optionally, in the primary exploration partitions, distances between antennas need to be considered for partitioning, and whether each antenna belongs to antennas in previous primary exploration partitions, or whether each antenna is antennas in a target antenna set whose channel capacity changes also needs to be considered. Therefore, it may be avoided as much as possible that the primary exploration partitions include antennas with poor performance again. That the selection unit 401 selects the $M_1$ antenna sets from the $C_{N_1}^{L_2}$ $(C_{L_3}^1 \ldots C_{L_3}^1)_{L_2}$ antenna combinations specifically includes:

setting a first weight for each of other partitions based on distances between $N_3$ reserved partitions and the other partitions except the $N_3$ reserved partitions in the $N_1$ partitions, where the distance is in direct proportion to the first weight, and the $N_3$ reserved partitions are $N_3$ partitions including the reserved antennas, in the $N_1$ partitions;

setting a second weight for each of the other partitions based on partitions where non-reserved antennas in the target antenna set used in the previous data transmission within preset-duration belong to, where second weights for partitions where antennas in the target antenna set used in the previous data transmission within preset-duration belong to, are less than second weights for partitions where antennas in a target antenna set not used in the previous data transmission within preset-duration belong to;

determining, in the other partitions, partitions with the largest sum of the first weight and the second weight as primary exploration partitions; and selecting the $M_1$ antenna sets from the $C_{N_2}^{L_2}$ $(C_{L_3}^1 \ldots C_{L_3}^1)_{L_2}$ antenna combinations, where $N_2$ is a quantity of primary exploration partitions in the $N_1$ partitions.

That the selection unit 401 selects the $M_1$ antenna sets from the $C_{N_2}^{L_2}$ $(C_{L_3}^1 \ldots C_{L_3}^1)_{L_2}$ antenna combinations specifically includes:

determining $L_2$ antennas that are in the $N_2$ primary exploration partitions and that are most correlated with the reserved antennas in the $N_3$ reserved partitions, to form the farthest set of the $N_2$ primary exploration partitions;

determining $L_2$ antennas that are in the $N_2$ primary exploration partitions and that are least correlated with the reserved antennas in the $N_3$ reserved partitions, to form the nearest set of the $N_2$ primary exploration partitions;

selecting the $L_1$ reserved antennas to be combined with the farthest set of the primary exploration partitions and the nearest set of the primary exploration partitions to obtain $M_4$ antenna sets;

sequentially switching the antenna selection circuit to the $M_4$ antenna sets, to obtain SNRs of each reserved antenna and each antenna in the $N_2$ primary exploration partitions; and selecting $L_2$ antennas with a maximum SNR in the $N_2$ primary exploration partitions, to obtain a first antenna set with the maximum SNR, where the $M_1$ antenna sets include the farthest set of the $N_2$ primary exploration partitions, the nearest set of the $N_2$ primary exploration partitions, and the first antenna set with the maximum SNR.

In an optional implementation, when the $M_1$ antenna sets are determined, antennas in secondary exploration partitions may be further considered. For example, the selecting unit 401 is further configured to select $M_5$ antenna sets from $C_{N_1-N_2-N_3}^{L_2}$ $(C_{L_3}^1 \ldots C_{L_3}^1)_{L_2}$ $C_{N_3}^{L_1}$ $(C_{L_3-L_4}^1 \ldots C_{L_3-L_4}^1)_{L_1}$ antenna combinations. $(C_{L_3-L_4}^1 \ldots C_{L_3-L_4}^1)_{L_1}$ represents multiplying $L_1$ $C_{L_3-L_4}^1$.

$N_1-N_2-N_3$ is a quantity of secondary exploration partitions. The secondary exploration partitions are partitions except the reserved partitions and the primary exploration partitions in the $N_1$ partitions. $L_4$ is a quantity of reserved antennas included in each reserved partition. $L_3-L_4$ are a quantity of non-reserved antennas in each reserved partition. Each of the $M_5$ antenna sets includes $L_3-L_4$ non-reserved antennas and $L_2$ antennas in the secondary exploration partitions.

The switching unit is further configured to sequentially switch the antenna selection circuit to antennas in the $M_5$ antenna sets, to obtain an SNR of each antenna in the $M_5$ antenna sets.

The determining unit is further configured to determine, in the N antennas, L antennas with a maximum SNR as a second antenna set with a maximum SNR based on the SNR of each reserved antenna, the SNR of each antenna in the $N_2$ primary exploration partitions, and the SNR of each antenna in the $M_4$ antenna sets, where the $M_2$ antenna sets further include the second antenna set with the maximum SNR.

In an optional implementation, the determining unit 402 is further configured to: after the data transmission within preset-duration is performed by using the target antenna set, determine, in the $M_2$ antenna sets, the antenna set with the maximum channel capacity as the target antenna set, to perform the operation of switching the antenna selection circuit to the antennas in the target antenna set, to perform the data transmission within preset-duration.

For concepts, explanations, detailed descriptions, and other steps that are related to the technical solutions provided in this embodiment of this application and that are related to the antenna selection apparatus, refer to the descriptions about the content in the foregoing methods or other embodiments. Details are not described herein again.

Figure 11:
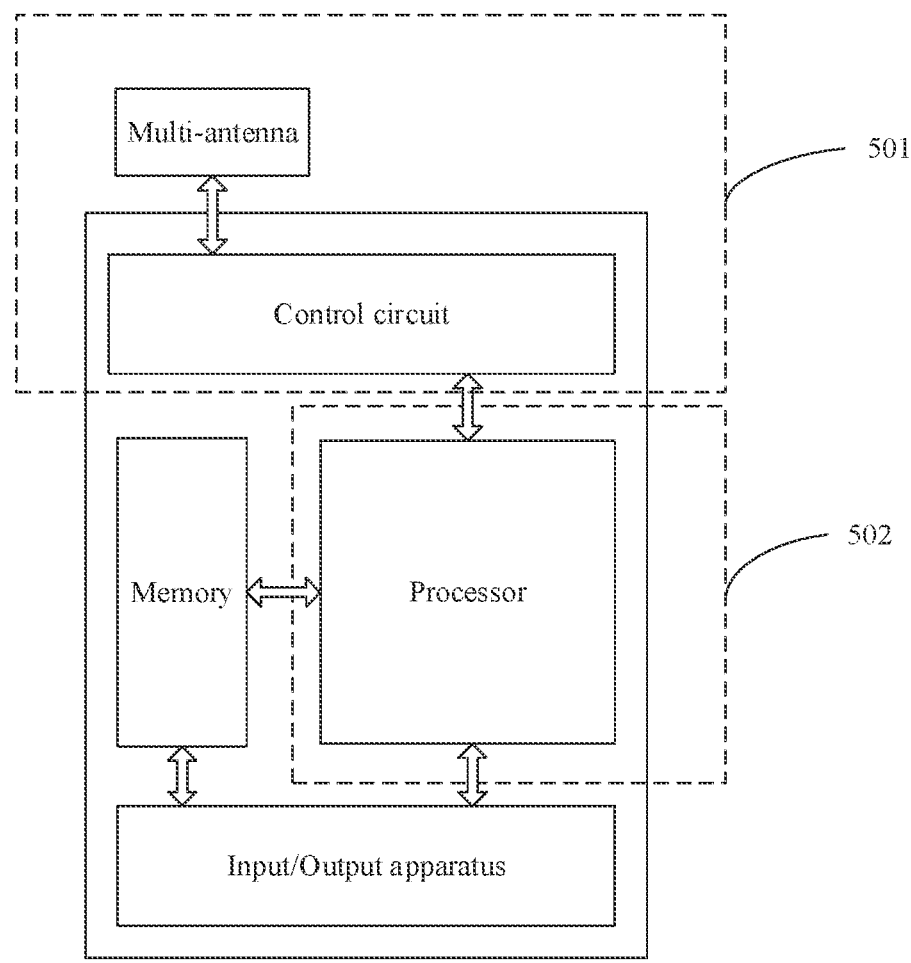
FIG. 11 is a schematic diagram of a structure of a device according to an embodiment of this application.

Referring to FIG. 11, FIG. 11 is a schematic diagram of a structure of a device according to an embodiment of this application. As shown in FIG. 11, the device may be a receiving end or a transmitting end in the embodiments of this application, or may be a network device or a terminal device. For ease of description, in FIG. 11, a terminal device is used as an example for description, and only main components of the terminal device are shown. As shown in FIG. 11, the terminal device includes a processor, a memory, a control circuit, a multi-antenna, and an input/output apparatus. The processor is mainly configured to process a communication protocol and communication data, control the entire terminal device, execute a software program, and process data of the software program. For example, the processor is configured to support the terminal device in performing actions of the receiving end, described in related embodiments of the foregoing antenna selection method. The memory is mainly configured to store a software program and data, for example, various correspondences. The control circuit is mainly configured to perform conversion between a baseband signal and a radio frequency signal, and process the radio frequency signal. A combination of the control circuit and the antenna may also be referred to as a transceiver that is mainly configured to receive/send a radio frequency signal in a form of an electromagnetic wave. The input/output apparatus, for example, a touchscreen, a display screen, or a keyboard, is mainly configured to receive data entered by a user and output data to the user.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in a form of the electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and only one processor. An actual terminal device may have a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 11 is integrated with functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to be used in different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

For example, in this embodiment of the present invention, the antenna having a transceiver function and the control circuit may be considered as a transceiver unit 501 of the terminal device, and the processor having a processing function may be considered as a processing unit 502 of the terminal device. As shown in FIG. 11, the terminal device includes the transceiver unit 501 and the processing unit 502. The transceiver unit may also be referred to as a transceiver, a transceiver machine, a transceiver apparatus, or the like. Optionally, a component that is in the transceiver unit 501 and that is configured to implement a receiving function may be considered as a receiving unit, and a component that is in the transceiver unit 501 and that is configured to implement a sending function may be considered as a sending unit. In other words, the transceiver unit 501 includes the receiving unit and the sending unit. For example, the receiving unit may also be referred to as a receiver, a receiving set, a receiving circuit, or the like, and the sending unit may be referred to as a transmitter, a transmitting set, a transmitting circuit, or the like.

In this embodiment of this application, the processor, namely, the processing unit 502, is configured to: select $M_1$ antenna sets from $C_{N-L_1}^{L_2}$ antenna combinations, where $L_1$ is a quantity of reserved antennas, and a sum of $L_1$ and $L_2$ is equal to L; and determine, in $M_2$ antenna sets, an antenna set with a maximum channel capacity as a target antenna set, where the $M_2$ antenna sets are antenna sets formed by the $M_1$ antenna sets and the $L_1$ reserved antennas, and $M_1$ is equal to $M_2$. In this way, the processor combines, based on the $L_1$ reserved antennas, N antennas deployed at the receiving end, so that each of the $M_2$ antenna sets may include the $L_1$ antennas with a maximum SNR. Therefore, a probability of an antenna set with comparatively poor performance in the $M_2$ antenna sets is greatly reduced.

Further, in a process in which the transceiver, namely, the transceiver unit 501, is configured to explore a channel capacity of each of the $M_2$ antenna sets, to determine the antenna set with the maximum channel capacity as the target antenna set, when an antenna selection circuit in the transceiver switches between the $M_2$ antenna sets to perform transient data transmission, sudden performance deterioration can be avoided with a great probability. Finally, the processor may perform data transmission within preset-duration again by using the transceiver and the determined target antenna set.

For concepts, explanations, detailed descriptions, and other steps that are related to the technical solutions provided in the embodiments of this application and that are related to the device, refer to the descriptions about the content in the foregoing methods or other embodiments. Details are not described herein again.

Figure 12:
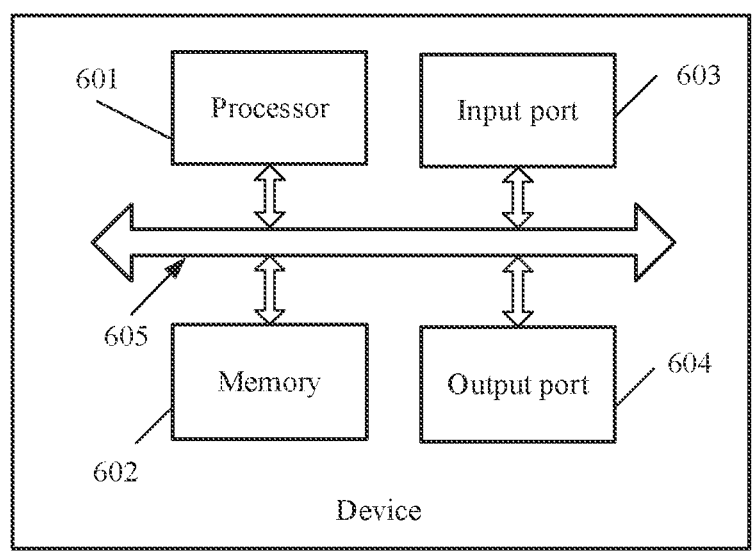
FIG. 12 is a schematic diagram of a structure of another device according to an embodiment of this application.

Referring to FIG. 12, FIG. 12 is a schematic diagram of a structure of another device according to an embodiment of this application. The device may be a terminal device or a network device, or may be a chip or a circuit, for example, a chip or a circuit that may be disposed in a terminal device or a network device. The device may include a processor 601 and a memory 602. The memory 602 is configured to store an instruction, and the processor 601 is configured to execute the instruction stored in the memory 602, so that the device implements the method or implementation corresponding to FIG. 1 to FIG. 8b.

Further, the device may further include an input port 603 and an output port 604. Further, the device may further include a bus system 605.

The processor 601, the memory 602, the input port 603, and the output port 604 are connected to each other by using the bus system 605. The processor 601 is configured to execute the instruction stored in the memory 602, to control the input port 603 to receive a signal and control the output port 604 to send a signal, to complete the steps of the network device in the foregoing methods. The input port 603 and the output port 604 may be a same physical entity or different physical entities. When the input port 603 and the output port 604 are the same physical entity, the input port 603 and the output port 604 may be collectively referred to as an input/output port. The memory 602 may be integrated into the processor 601, or may be disposed separately from the processor 601.

In an implementation, it may be considered that functions of the input port 603 and the output port 604 are implemented by using a transceiver circuit or a dedicated transceiver chip. It may be considered that the processor 601 is implemented by using a dedicated processing chip, a processing circuit, a processor, or a general-purpose chip.

In another implementation, it may be considered that the network device provided in the embodiments of the present invention is implemented by using a general-purpose computer. In other words, program code that is used to implement functions of the processor 601, the input port 603, and the output port 604 is stored in the memory, and a general purpose processor implements the functions of the processor 601, the input port 603, and the output port 604 by executing the code in the memory.

For concepts, explanations, detailed descriptions, and other steps that are related to the technical solutions provided in the embodiments of this application and that are related to the device, refer to the descriptions about the content in the foregoing methods or other embodiments. Details are not described herein again.

Alternatively, the apparatus in the embodiments of this application may be a universal processing system. For example, the universal processing system is usually referred to as a chip. The universal processing system includes one or more microprocessors that provide a processor function, and an external memory that provides at least a part of a storage medium. All these components are connected to other supporting circuits by using an external bus architecture.

It should further be understood that the "first", "second", "third", and "fourth" and various digital numbers in this specification are merely for differentiation for ease of description, and are not intended to limit the scope of the embodiments of the present invention.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, in combination with illustrative logical blocks (illustrative logical block) described in the embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. An antenna selection method implemented by a device, N antennas are deployed in the device, wherein the method comprises:

determining, based on a service requirement of the device, a quantity L of antennas configured to transmit data, wherein N is a positive integer greater than 2, and wherein L is a positive integer greater than or equal to 2 and less than N;

selecting $M_1$ antenna sets from $C_{N-L_1}^{L_2}$ antenna combinations, wherein $L_1$ reserved antennas comprise a maximum signal-to-noise ratio (SNR) in a target antenna set used in previous data transmission within a preset duration, wherein $L_1$ and $L_2$ are positive integers, and wherein a sum of $L_1$ and $L_2$ is equal to L;

determining, in $M_2$ antenna sets, an antenna set comprising a maximum channel capacity as a target antenna set, wherein the M2 antenna sets comprise the $M_1$ antenna sets and the $L_1$ reserved antennas, wherein $M_1$ and $M_2$ are positive integers, and wherein $M_1$ is equal to $M_2$, and switching an antenna selection circuit to antennas in the target antenna set to perform data transmission during the preset duration.

2. The antenna selection method of claim 1, wherein while performing the data transmission during the preset duration, the antenna selection method further comprises:
- detecting whether channel capacity of the target antenna set changes; and
- further selecting the $M_1$ antenna sets from the $C_{N-L_1}^{L_2}$ antenna combinations when the channel capacity changes.

3. The antenna selection method of claim 2, further comprising determining, in $M_3$ initially set antenna sets comprising stable performance, an antenna set comprising a maximum channel capacity as the target antenna set to perform switching the antenna selection circuit to the antennas in the target antenna set to perform the data transmission during the preset duration, wherein $M_3$ is a positive integer.

4. The antenna selection method of claim 2, further comprising:
- determining, in $M_3$ initially set antenna sets comprising stable performance, an antenna set comprising a maximum channel capacity, wherein $M_3$ is a positive integer;
- determining, in the antenna set comprising the maximum channel capacity, the $L_1$ reserved antennas; and
- further selecting, based on the $L_1$ reserved antennas, the $M1$ antenna sets from the $C_{N-L_1}^{L_2}$ antenna combinations.

5. The antenna selection method of claim 1, further comprising:
- partitioning the N antennas based on correlation among the N antennas to obtain $N_1$ partitions, wherein each of the $N_1$ partitions comprises $L_3$ antennas, and wherein $L_3$ is a positive integer; and
- further selecting the $M1$ antenna sets from $C_{N_1}^{L_2}(C_{L_3}^1 \ldots C_{L_3}^1)_{L_2}$ antenna combinations, wherein antennas in each antenna set belong to different partitions, and wherein $(C_{L_3}^1 \ldots C_{L_3}^1)_{L_2}$ represents multiplying $C_{L_3}^1$ by $C_{L_3}^1$ $L_2$ number of times.

6. The antenna selection method of claim 5, further comprising:
- determining, in other partitions except $N_3$ reserved partitions in the $N_1$ partitions, partitions comprising a largest distance to the $N_3$ reserved partitions as primary exploration partitions in the $N_1$ partitions, wherein the $N_3$ reserved partitions are $N_3$ partitions comprising the reserved antennas in the $N_1$ partitions; and
- further selecting the $M1$ antenna sets from $C_{N_2}^{L_2}(C_{L_3}^1 \ldots C_{L_3}^1)_{L_2}$, antenna combinations, wherein $N_2$ is a quantity of the primary exploration partitions, and wherein $N_2$ and $N_3$ are positive integers.

7. The antenna selection method of claim 5, further comprising:
- setting a first weight for each of other partitions based on distances between $N_3$ reserved partitions and the other partitions except the $N_3$ reserved partitions in the $N_1$ partitions, wherein each of the distances is in direct proportion to the first weight, and wherein the $N_3$ reserved partitions are $N_3$ partitions comprising the reserved antennas in the $N_1$ partitions;
- setting a second weight for each of the other partitions based on partitions comprising non-reserved antennas in the target antenna set used in the previous data transmission within the preset duration, wherein second weights for partitions comprising antennas in the target antenna set used in the previous data transmission within the preset duration are less than second weights for partitions comprising antennas in a target antenna set not used in the previous data transmission within the preset duration;
- determining, in the other partitions, partitions comprising a largest sum of the first weight and the second weight as primary exploration partitions in the $N_1$ partitions; and
- further selecting the M1 antenna sets from the $C_{N_2}^{L_2}(C_{L_3}^1 \ldots C_{L_3}^1)_{L_2}$, antenna combinations, wherein $N_2$ is a quantity of the primary exploration partitions, and wherein $N_2$ and $N_3$ are positive integers.

8. The antenna selection method of claim 6, further comprising:
- determining $L_2$ of antennas in $N_2$ primary exploration partitions that are most correlated with the reserved antennas in the $N_3$ reserved partitions to form a farthest set of the $N_2$ primary exploration partitions;
- determining $L_2$ of antennas in the $N_2$ primary exploration partitions that are least correlated with the reserved antennas in the $N_3$ reserved partitions to form a nearest set of the $N_2$ primary exploration partitions;
- selecting the $L_1$ reserved antennas to be combined with the farthest set of the $N_2$ primary exploration partitions and the nearest set of the $N_2$ primary exploration partitions to obtain $M_4$ antenna sets, wherein $M_4$ is a positive integer;
- sequentially switching the antenna selection circuit to the $M_4$ antenna sets to obtain an SNR of each reserved antenna and an SNR of each antenna in the $N_2$ primary exploration partitions; and
- selecting $L_2$ of antennas with a maximum SNR in the $N_2$ primary exploration partitions to obtain a first antenna set with the maximum SNR, wherein the $M_1$ antenna sets comprise the farthest set of the $N_2$ primary exploration partitions, the nearest set of the $N_2$ primary exploration partitions, and the first antenna set.

9. The antenna selection method of claim 8, further comprising:
- selecting $M_5$ antenna sest from $C_{N_1-N_2-N_3}^{L_2}(C_{L_3}^1 \ldots C_{L_3}^1)_{L_1}$ antenna combinations, wherein $(C_{L_3-L_4}^1 \ldots C_{L_3-L_4}^1)_{L_1}$ represents multiplying $C_{L_3-L_4}^1$ by $C_{L_3-L_4}^1$ $L_1$ number of times, wherein $N_1$-$N_2$-$N_3$ is a quantity of secondary exploration partitions, wherein the secondary exploration partitions are partitions except the reserved partitions and the primary exploration partitions in the $N_1$ partitions, wherein $L_4$ is a quantity of reserved antennas comprised in each of the reserved partitions, wherein L3-L4 is a quantity of non-reserved antennas in each of the reserved partitions, wherein each of the M5 antenna sets comprises $L_3$-$L_4$ non-reserved antennas and $L_2$ antennas in the secondary exploration partitions, and wherein M5 and L4 are positive integers;
- sequentially switching the antenna selection circuit to antennas in the $M_5$ antenna sets to obtain an SNR of each antenna in the $M_5$ antenna sets; and
- determining, in the N antennas, the L antennas comprising a maximum SNR as a second antenna set comprising the maximum SNR based on the SNR of each of the reserved antennas, the SNR of each of the antennas in the $N_2$ primary exploration partitions, and the SNR of each of the antennas in the $M_5$ antenna sets, wherein the $M_2$ antenna sets further comprise the second antenna set.

10. The antenna selection method of claim 9, wherein after performing the data transmission within the preset duration, the antenna selection method further comprises determining, in the $M_2$ antenna sets, the antenna set with the maximum channel capacity as the target antenna set to switch the antenna selection circuit to the antennas in the target antenna set to perform the data transmission.

11. A device comprising:
N antennas, wherein N is a positive integer greater than 2; and
a processor coupled to the N antennas and configured to:
determine, based on a service requirement of the device a quantity L of antennas configured to transmit data, wherein L is a positive integer greater than or equal to 2 and less than N;
select $M_1$ antenna sets from $C_{N-L_1}^{L_2}$ antenna combinations, wherein L reserved antennas comprise a maximum signal-to-noise ratio (SNR) in a target antenna set used in previous data transmission within a preset duration, wherein $L_1$ and $L_2$ are positive integers, and wherein a sum of $L_1$ and $L_2$ is equal to L;
determine, in $M_2$ antenna sets, an antenna set comprising a maximum channel capacity as a target antenna set, wherein the $M_2$ antenna sets comprises the $M_1$ antenna sets and the $L_1$ reserved antennas, wherein $M_1$ and $M_2$ are positive integers, and wherein $M_1$ is equal to $M_2$; and
switch an antenna selection circuit to antennas in the target antenna set to perform data transmission during the preset duration.

12. The device of claim 11, wherein while performing the data transmission during the preset duration, the processor is further configured to:
detect whether channel capacity of the target antenna set changes; and
further select the $M_1$ antenna sets from the $C_{N-L_1}^{L_2}$ antenna combinations when the channel capacity changes.

13. The device of claim 12, wherein the processor is further configured to determine, in $M_3$ initially set antenna sets comprising stable performance, an antenna set comprising a maximum channel capacity as the target antenna set to perform switching the antenna selection circuit to the antennas in the target antenna set to perform the data transmission during the preset duration, and wherein $M_3$ is a positive integer.

14. The device of claim 12, wherein the processor is further configured to:
determine, in $M_3$ initially set antenna sets comprising stable performance, an antenna set comprising a maximum channel capacity, wherein $M_3$ is a positive integer;
determine, in the antenna set comprising the maximum channel capacity, the $L_1$ reserved antennas; and
further select, based on the $L_1$ reserved antennas, the $M_1$ antenna sets from the $C_{N-L_1}^{L_2}$ antenna combinations.

15. The device of claim 11, wherein the processor is further configured to:
partition the N antennas based on correlation among the N antennas to obtain $N_1$ partitions, wherein each of the $N_1$ partitions comprises $L_3$ antennas, and wherein $L_3$ is a positive integer; and
further select the $M_1$ antenna sets from $C_{N_2}^{L_2}$ ($C_{L_3}^1$ ... $C_{L_3}^1)_{L_2}$ antenna combinations, wherein antennas in each antenna set belong to different partitions, and wherein $(C_{L_3}^1 ... C_{L_3}^1)_{L_2}$ represents multiplying $C_{L_3}^1$ by $C_{L_3}^1$ $L_2$ number of times.

16. The device of claim 15, wherein the processor is further configured to:
determine, in other partitions except $N_3$ reserved partitions in the $N_1$ partitions, partitions comprising a largest distance to the $N_3$ reserved partitions as primary exploration partitions in the $N_1$ partitions, wherein the $N_3$ reserved partitions are $N_3$ partitions comprising the reserved antennas in the $N_1$ partitions; and
further select the $M_1$ antenna sets from $C_{N_2}^{L_2}$ ($C_{L_3}^1$ ... $C_{L_3}^1)_{L_2}$ antenna combinations, wherein $N_2$ is a quantity of the primary exploration partitions, and wherein $N_2$ and $N_3$ are positive integers.

17. The device of claim 15, wherein the processor is further configured to:
set a first weight for each of other partitions based on distances between $N_3$ reserved partitions and the other partitions except the $N_3$ reserved partitions in the $N_1$ partitions, wherein each of the distances is in direct proportion to the first weight, and wherein the $N_3$ reserved partitions are $N_3$ partitions comprising the reserved antennas in the $N_1$ partitions;
set a second weight for each of the other partitions based on partitions comprising non-reserved antennas in the target antenna set used in the previous data transmission within the preset duration, wherein second weights for partitions comprising antennas in the target antenna set used in the previous data transmission within the preset duration are less than second weights for partitions comprising antennas in a target antenna set not used in the previous data transmission within the preset duration;
determine, in the other partitions, partitions comprising a largest sum of the first weight and the second weight as primary exploration partitions in the $N_1$ partitions; and
further select the $M_1$ antenna sets from the $C_{N_2}^{L_2}$ ($C_{L_3}^1$ ... $C_{L_3}^1)_{L_2}$ antenna combinations, wherein $N_2$ is a quantity of the primary exploration partitions, and wherein $N_2$ and $N_3$ are positive integers.

18. A chip system, configured to:
determine, based on a service requirement of a device, a quantity L of antennas configured to transmit data, wherein N antennas are deployed in the device, N is a positive integer greater than 2, and wherein L is a positive integer greater than or equal to 2 and less than N;
select $M_1$ antenna sets from $C_{N-L_1}^{L_2}$ antenna combinations, wherein $L_1$ reserved antennas comprise a maximum signal-to-noise ratio (SNR) in a target antenna set used in previous data transmission within a preset duration, wherein $L_1$ and $L_2$ are positive integers, and wherein a sum of $L_1$ and $L_2$ is equal to L;
determine, in $M_2$ antenna sets, an antenna set comprising a maximum channel capacity as a target antenna set, wherein the $M_2$ antenna sets comprise the $M_1$ antenna sets and the L1 reserved antennas, and wherein $M_1$ is equal to $M_2$; and
switch an antenna selection circuit to antennas in the target antenna set to perform data transmission during the preset duration.

19. The chip system of claim 18, further configured to:
detect whether channel capacity of the target antenna set changes; and
further select the M1 antenna sets from the $C_{N-L_1}^{L_2}$ antenna combinations when the channel capacity changes.

20. The chip system of claim 19, further configured to determine, in $M_3$ initially set antenna sets comprising stable performance, an antenna set with a maximum channel capacity as the target antenna set to perform switching the antenna selection circuit to the antennas in the target antenna set to perform the data transmission during the preset duration, wherein $M_3$ is a positive integer.

* * * * *

UNITED STATES PATENT AND TRADEMARK OFFICE
CERTIFICATE OF CORRECTION

| | | |
|---|---|---|
| PATENT NO. | : 11,362,711 B2 | Page 1 of 1 |
| APPLICATION NO. | : 17/299179 | |
| DATED | : June 14, 2022 | |
| INVENTOR(S) | : Chang et al. | |

It is certified that error appears in the above-identified patent and that said Letters Patent is hereby corrected as shown below:

In the Claims

Claim 9, Column 32, Line 40: "$C_{N1-N2-N3}^{L2}(C_{L3}^{1}...C_{L3}^{1})_{L1}$" should read "$C_{N1-N2-N3}^{L2}(C_{L3}^{1}...C_{L3}^{1})_{L2}C^{L1}{}_{N3}(C_{L3-L4}^{1}...C_{L3-L4}^{1})_{L1}$"

Claim 11, Column 33, Line 13: "wherein Lreserved" should read "wherein $L_1$ reserved"

Claim 16, Column 33, Line 63: "the processor-is" should read "the processor is"

Signed and Sealed this
Twenty-sixth Day of July, 2022

*Katherine Kelly Vidal*

Katherine Kelly Vidal
*Director of the United States Patent and Trademark Office*